United States Patent [19]

Miwa et al.

[11] Patent Number: 4,552,021

[45] Date of Patent: Nov. 12, 1985

[54] ELECTRO-SOUND TRANSDUCER ELIMINATING ACOUSTIC MULTI-REFLECTION, AND ULTRASONIC DIAGNOSTIC APPARATUS APPLYING IT

[75] Inventors: Hirohide Miwa, Kawasaki; Hajime Hayashi, Yamato; Takaki Shimura, Machida; Atsuo Iida, Yokohama; Fumihiro Namiki, Yokohama; Kenji Kawabe, Yokohama; Narutaka Nakao, Yokohama, all of Japan

[73] Assignee: Fujitsu Limited, Kawasaki, Japan

[21] Appl. No.: 567,372

[22] Filed: Dec. 30, 1983

[30] Foreign Application Priority Data

| | | | |
|---|---|---|---|
| Dec. 30, 1982 | [JP] | Japan | 57-234070 |
| Feb. 8, 1983 | [JP] | Japan | 58-19182 |
| Mar. 10, 1983 | [JP] | Japan | 58-39908 |

[51] Int. Cl.[4] .................... G01N 29/04

[52] U.S. Cl. .................... 73/644; 73/617

[58] Field of Search .................... 73/609, 617, 644, 614, 73/628, 629; 128/660

[56] References Cited

U.S. PATENT DOCUMENTS

| | | | |
|---|---|---|---|
| 3,937,068 | 2/1976 | Joy | 73/644 |
| 4,153,894 | 5/1979 | Alphonse et al. | 73/644 |
| 4,195,530 | 4/1980 | Ross et al. | 73/644 |

FOREIGN PATENT DOCUMENTS

| | | | |
|---|---|---|---|
| 738941 | 10/1955 | United Kingdom | 73/644 |
| 766983 | 1/1957 | United Kingdom | 73/644 |
| 2009563 | 6/1979 | United Kingdom | 73/644 |
| 2011219 | 7/1979 | United Kingdom | 73/644 |

*Primary Examiner*—Anthony V. Ciarlante

*Attorney, Agent, or Firm*—Staas & Halsey

[57] ABSTRACT

An ultrasonic diagnostic apparatus protected from multi-reflection of sound echoes. Multi-reflection is avoided by eliminating the reflection from the surface of an electro-sound transducer. This invention eliminates the surface reflection of the transducer by following three methods:

(a) changing a direction of each surface of an array of transducer elements to direct the reflected sound wave away from the main direction of the sound beam;

(b) applying an acoustic matching layer to a surface of a piezo-electric device of the transducer to cancel out phases of sound waves reflected by the surfaces of the layer and the device; and (c) providing an acoustic matching surface on a front or back face of the piezo-electric device to cancel out phases of sound waves reflected by the surface of the device.

26 Claims, 32 Drawing Figures

FIG. 5. (PRIOR ART)
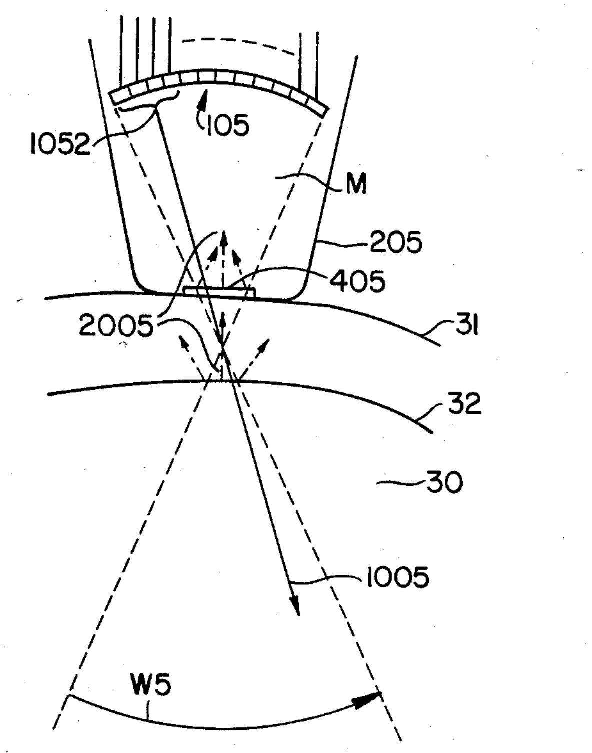
FIG. 6. (PRIOR ART)
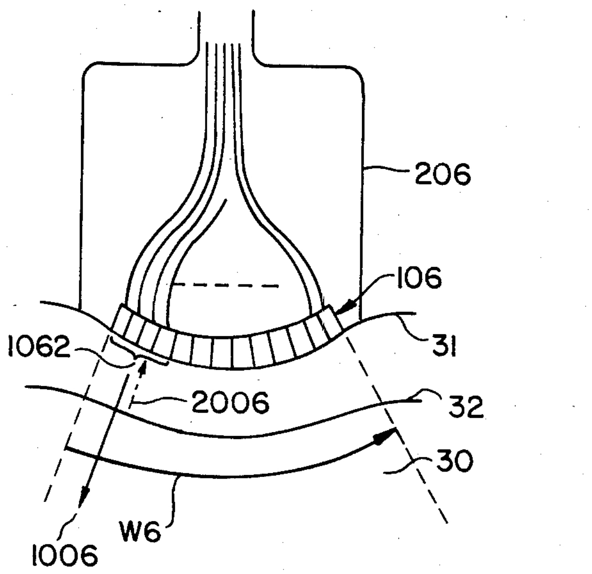
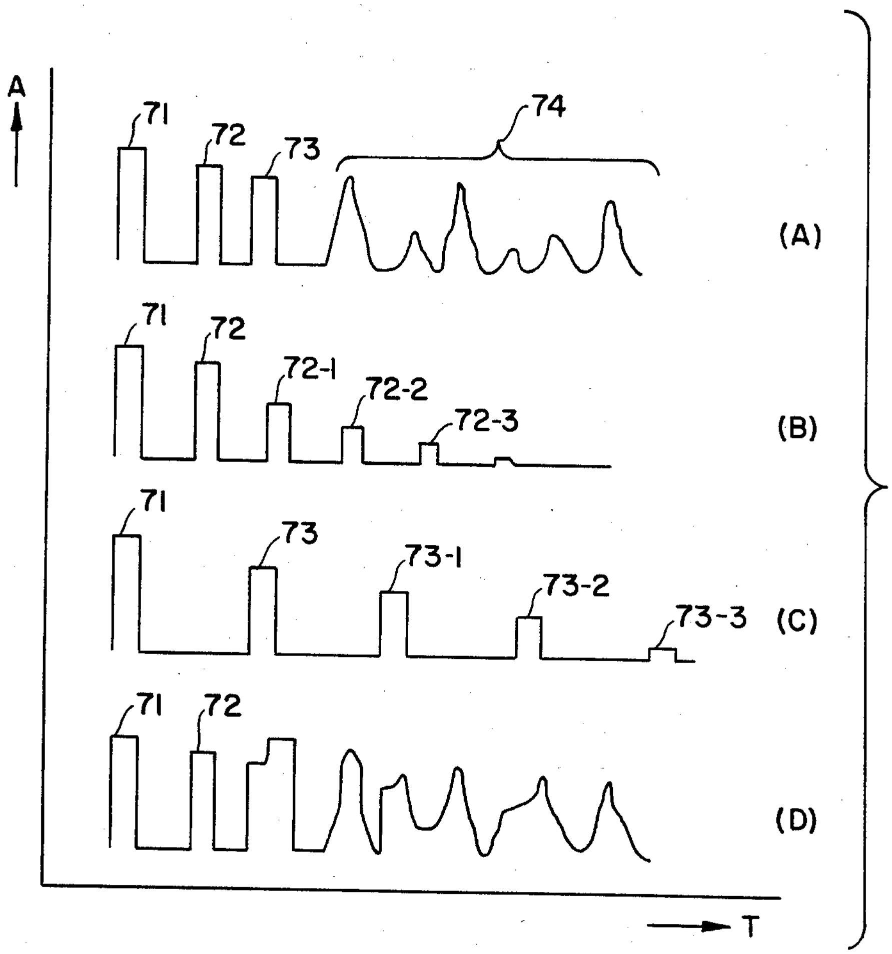
FIG. 7.

ELECTRO-SOUND TRANSDUCER ELIMINATING ACOUSTIC MULTI-REFLECTION, AND ULTRASONIC DIAGNOSTIC APPARATUS APPLYING IT

BACKGROUND OF THE INVENTION

The present invention relates to an electro-sound transducer and an ultrasonic diagnostic apparatus using it. More precisely the present invention provides an electro-sound transducer protected from acoustic multi-reflection which causes medical error information of an ultrasonic diagnostic apparatus.

The present invention reduces the acoustic multi-reflection by reducing the reflection on the surface of the electro-sound transducer, and involves:

rearrangement of each surface direction of the array of transducer elements for avoiding the reflected sound waves;

an acoustic matching layer attached to a piezo-electric device, thus eliminating the reflected sound waves; and an acoustic matching surface which divides a face of a piezo-electric device into groups having specified area and acoustic reflection factors to eliminate multi-reflection.

In order to disclose the present invention it is necessary to describe briefly the prior art technology of ultrasonic tomography. The ultrasonic diagnostic apparatus is used mainly for observation with ultrasonic tomograms of the human body. It includes a means to radiate and receive sound waves. The electro-sound transducer is a device to radiate sound waves and to receive sound echoes by converting electric signals to sound power and vice versa, based on the piezo-electric effect using lead zirconate titanate (PZT), for instance.

The technology of focusing and scanning a sound beam has many resemblances to microwave technology. The pulse-echo method is similar to a radar system. When electric pulse signals are applied to the transducer, the transducer radiates a sound pulse toward a target (such as a human body), and receives a sound echo from the target. The received sound echoes are converted to electric signals which have information concerning the distances between the transducer and the targets. The intensity of a reflected sound echo corresponds to the acoustic impedance and the transmission character of a target.

FIG. 1 and FIG. 2 show schematically a prior art probe, which radiates/receives and scans a sound wave using only one transducer element.

In FIG. 1, 101 is a transducer which consists of one transducer element (hereinafter simply referred to as "element 101", etc) and generates a single sound-beam 1001. 101-1 is a transducer mount-base on which three or four elements, for instance, are mounted. The mount 101-1 is rotated to scan within a scanning angular width W1 as indicated by dotted lines. 201 shows a part of a transducer housing called a probe unit. 30 is a target such as a human body. 401 is a window made of acoustically transparent material which has almost same acoustic impedance as target 30 and is equipped on an outer surface of the probe 201. The window 401 is for sealing an acoustically transmissible medium as is mentioned further below, and for contacting to the target 30 to reduce ultrasonic loss between the probe 201 and the target 30. M is a medium made of acoustically transmissible material such as silicon rubber, water, or castor oil which are filled in a space between element 101 and window 401. The medium M has almost the same acoustic impedance as window 401 to reduce ultrasonic loss between element 101 and window 401.

In FIG. 2, 102 is a transducer which consists of one transducer element and generates a single sound-beam 1002, 202 is a probe unit, 402 is a window, and 502 is an acoustic reflector placed in a sound pass between the element 102 and the window 402. The reflector 502 oscillates for scanning the single-beam 1002 within the scan width W2 as indicated by the dotted lines. A sound path between element 102 and window 402 is filled by a medium M as in the foregoing example.

The received electronic signals are usually displayed on a cathode-ray tube synchronizing with the scanning, thus providing visible information (an ultrasonic tomogram) of the sound echo.

Recently array technology has been introduced into the transducer. The array transducer arose owing to the advanced technology of the fabrication and control of a multi-element transducer. The array transducer generates, focuses and scans a synthesized sound beam (SS-beam).

The array transducer is a combination of small transducer elements. The wave-fronts of a single-beam from each element are combined together to form a SS-beam. This SS-beam can be focused or scanned by controlling the phase or sequence of an electric pulse signal applied to each element.

The synthesis of the sound beam of the phase control of the sequential pulse signal applied to each element can be done by an electric delay-line or a sequential switch control circuit. The signals received by each transducer element are processed to produce signals for a display, using the same delay-line or the same sequential switch control circuit mentioned above.

There are two kinds of array transducers, one is a phased array transducer and the other is a linear array transducer.

FIG. 3 shows schematically a typical probe unit having a phased array transducer. In the figure, 203 is a probe unit, 103 is a phased array transducer which is composed of a plurality of transducer elements 301. Each element 1031 is arranged on a plane and installed on the outer wall face of probe 203.

All of element 1031 are activated as the sometime but the phase of an electric pulse signal applied to each element 1031 is controlled to generate and scan the SS-beam 1003 within the scan width W3 indicated by the dotted lines.

A linear array transducer, on the other hand, generates an SS-beam by a sub-group of the elements, such as four or five elements, for instance. This SS-beam is shifted in parallel by shifting the elements of the sub-group one by one along the array of elements of the transducer, by sequentially switching the pulse signals applied to the sub-group elements.

FIG. 4 shows schematically a typical probe unit having a linear array transducer. In the figure, 204 is a probe unit, 104 is a linear array transducer which is arranged on a plane and installed on the outer face of the probe 204, and consists of a plurality of elements 1041.

Sequential switching of pulse signals applied to each element of the sub-group 1042 is controlled by a sequential switch control circuit to generate an SS-beam 1004 and make it shift in parallel as shown by arrow W4 and indicated by dotted lines.

FIGS. 5 and 6 show special probe units of an array transducer using the linear array technique.

FIG. 5 illustrates schematically a probe unit 205 using a concave linear array transducer 105 which has sub-group elements 1052. The sub-groups 1052 substantially generate an SS-beam 1005 which is scanned within a scanning angular width W5 as indicated by the dotted lines. Transducer 105 is located inside the probe 205 in order to scan a target 30 effectively within the scan width W5. Therefore a window 405 and a medium M are required.

This concave linear array system is able to scan a sound beam in a sector like in a phase array system with a high angular resolution. More detail is provided in Japanese Patent Publication No. Jitsukosho 52-41267.

FIG. 6 illustrates schematically a probe unit 206 using a convex linear array transducer 106 which has a sub-group element 1062. Sub-group 1062 generates an SS-beam 1006 and scans within the scan width W6 as indicated by the dotted lines.

An acoustically transmissible medium is filled between a transducer and a window as previously described in FIGS. 1, 2, and 5. This is intended to reduce loss of ultrasonic power, however it is difficult to make the acoustic impedance of the medium and of the window completely equal, so that a part of the radiated sound wave at the surface of the window is reflected back toward the transducer and a part of the sound wave reflected by the surface of the transducer element is reflected again toward the window. Thus acoustic multi-reflection occurs in the acoustic path between the transducer and the window.

Acoustic multi-reflection occurs not only at a window but also at a target. Because, no shown in FIGS. 1 to 6, there are some acoustic boundaries in the human body such as the surface of the skin 31, the boundary 32 of different tissue near the skin 31, etc.

In FIGS. 1 to 6, chain lines 2001, . . . , 2006 show reflected sound waves from the window and boundaries, and in these figures it is evident that multi-reflection will occur at the center part of a scanning angular width in the case of FIGS. 1, 2, 3 and 5, and at the whole scanning angular width in the case of FIGS. 4 and 6.

FIGS. 7(*a*) to (*d*) show patterns of received signals. In this figure, the horizontal axis is time T, and the vertical axis is a signal amplitude A.

FIG. 7(*a*) shows ideal received signals without an influence of multi-reflection. In the figure, 71 is a transmitting pulse, 72 is an echo signal of the window, 73 is an echo signal around the surface of human body (skin 31 and boundary 32), 74 are the echo signals of the inner human body from which medical diagnostic information will be taken.

FIG. 7(*b*) shows an example of the echo signals from the window 72, and its multi-reflected signals 72-1, 72-2, and 72-3.

FIG. 7(*c*) shows on example of echo signals from around the surface of the human body 73, and its multi-reflected signals 73-1, 73-2, and 73-3.

FIG. 7(*d*) shows a combined signal of signals FIG.(*a*), (*b*) and (*c*) which actually appears on display.

From the above explanation, it is evident that a multi-reflection causes misjudgement of diagnostic information from the display. This is the problem for a present ultrasonic diagnostic apparatus.

SUMMARY OF THE INVENTION

The object of the present invention, therefore, is to provide a means to reduce acoustic multi-reflection between a transducer and the window of an ultrasonic diagnostic apparatus or a target such as a human body.

In order to reduce multi-reflection, the present invention avoids reflection at a surface of the transducer element. If a reflected sound wave at the surface of the transducer element is prevented or eliminated, multi-reflection will not occur. For this purpose, the present invention contemplates the following methods.

The first of them is a method applying an array technology. Multi-reflection can be avoided by a rearrangement of the array transducer elements so that the main direction of SS-beam generated by the array transducer is different from the direction of a line that is normal to the surface of each element.

The second is a method applying an acoustic matching layer to a piezo-electric device. Multi-reflection can be avoided by setting a thickness and impedance of the acoustic matching layer so that the phases of the reflected sound waves from the surfaces of the piezo-electric device and the acoustic matching layers compensate each other.

The third is a method applying an acoustic matching surface to a piezo-electric device. Multi-reflection can be avoided by dividing the piezo-electric device surface into divided faces having different reflection factors and areas so that the phases of sound waves reflected by the divided faces compensate each other.

The construction and effect of the present invention will become clear in the following drawings and the description of preferred embodiments.

BRIEF DESCRIPTION OF THE DRAWINGS

FIG. 5 shows a schematic diagram of a prior art probe unit having a concave linear array transducer;

FIG. 6 shows a schematic diagram of a prior art probe unit having a convex linear array transducer;

FIGS. 7(A) to (D) illustrate received signals in prior art acoustic diagnostic apparatus contaminated by acoustic multi-reflection;

FIG. 7(A) shows ideal received signals with no influence of multi-reflection;

FIG. 7(B) shows an example of an echo signal from a window and its multi-reflected signals;

FIG. 7(C) shows an example of echo signals from around the surface of human body and its multi-reflected signals; and FIG. 7(D) shows the combination of the above signals which actually appears on a display;

FIGS. 14(A) and (B) show schematically still a further embodiment of a probe unit which has a phased array transducer and a scanning reflector; wherein FIG. 14(A) shows a sectional elevation view, and FIG. 14(B) shows a sectional plan view of the probe;

FIGS. 18(A) and (B) show schematically still another embodiment of a probe unit having a combination of phased array and linear array transducers which has a two-dimensional plane structure of transducer elements, wherein FIG. 18(A) shows its sectional front view and, FIG. 18(B) shows sectional side view;

FIGS. 22(A) to (D) relate to an embodiment of a transducer element structure having one F-layer and B-layer, a measuring system for a multi-reflection test, and its results; wherein FIG. 22(A) shows schematically an embodiment of a transducer element structure having one F-layer and B-layer;

FIG. 22(B) shows the measuring system for multi-reflection test;

FIG. 22(C) shows the measured result of a prior art transducer element; and

FIG. 22(D) shows the measured result of the transducer element of the present invention shown in FIG. 22(A);

FIGS. 22(A) and 22(B) relate to another embodiment of a transducer element structure having one F-layer; wherein

FIGS. 24(A) and (B) relate to still another embodiment of a transducer element structure having one F-layer and B-layer; wherein FIG. 24(A) shows the structure of the transducer element; and FIG. 24(B) shows its measured result;

FIGS. 25(A) and B relate to one more embodiment of a transducer element structure having two F-layers; wherein FIG. 25(A) shows the structure of the transducer element; and FIG. 25(B) shows its measured result;

FIGS. 26(A) and (B) relate to a further embodiment of a transducer element structure having one F-layer and B-layer; wherein, FIG. 26(A) shows the structure of the transducer element; and FIG. 26(B) shows its measured result;

FIGS. 29(A) and (B) relate to an embodiment of the transducer element structure having an acoustic matching surface on the end-face of a piezo-electric device providing a number of holes in which the acoustic medium is filled to avoid front multi-reflection of the transducer element; wherein FIG. 29(A) shows a front view, and FIG. 29(B) shows a sectional side view;

FIGS. 31(A) and (B) relate to another embodiment of a transducer element structure providing acoustic medium glued on the front face of a piezo-electric device to avoid front multi-reflection; wherein FIG. 31(A) shows a front view through the coating material, and FIG. 51(B) shows a section side view.

Throughout the figures like numerals designate like or similar parts of devices.

DESCRIPTION OF THE PREFERRED EMBODIMENTS

The present invention will be disclosed with respect to the preferred embodiments and the drawings.

Figure 1:
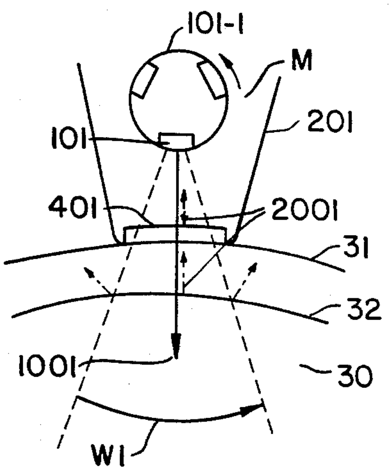
FIG. 1. (PRIOR ART)
FIG. 1 shows a schematic diagram of a prior art probe unit for an ultrasonic diagnostic apparatus having one transducer element, which is installed on a rotating mount-base for scanning.
Figure 3:
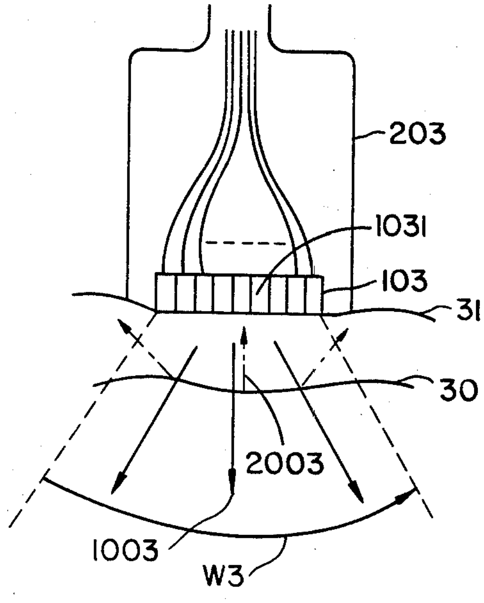
FIG. 3. (PRIOR ART)
FIG. 3 shows a schematic diagram of a prior art probe unit having a phased array transducer which is arranged on a plane and installed on the outer wall face of the probe unit.
Figure 2:
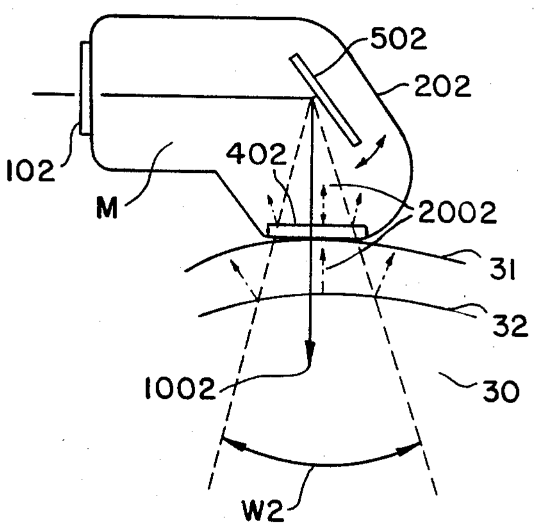
FIG. 2. (PRIOR ART)
FIG. 2 shows a schematic diagram of a prior art probe unit of an ultrasonic diagnostic apparatus having a one transducer element and an acoustic reflector oscillating for scanning.
Figure 4:
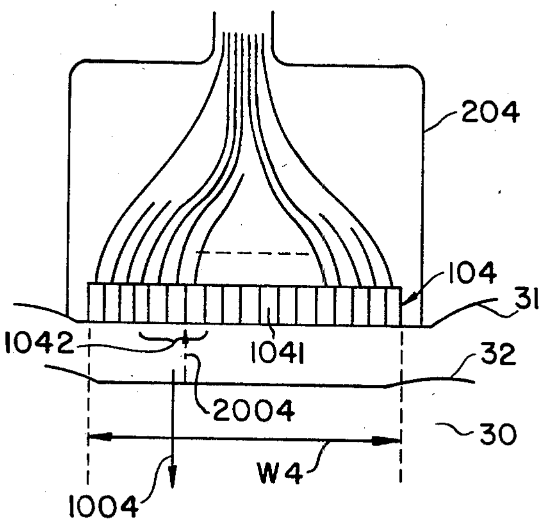
FIG. 4. (PRIOR ART)
FIG. 4 shows a schematic diagram of a prior art probe unit having a linear array transducer which is arranged on a plane and installed on the outer wall face of the probe unit.

FIGS. 8, 9, 11, 12 and 14 correspond to FIG. 2. They are all provided with a scanning reflector in the probe unit. The difference is that they are all provided with an array transducer, which generates an SS-beam, instead of one-element transducer as shown in FIG. 2. In these cases the array transducer does not function for scanning.

FIGS. 13 and 15 to 18 correspond to FIGS. 3 to 6 because they are provided with an array transducer which performs not only for producing the SS-beam but also for scanning.

Figure 8:
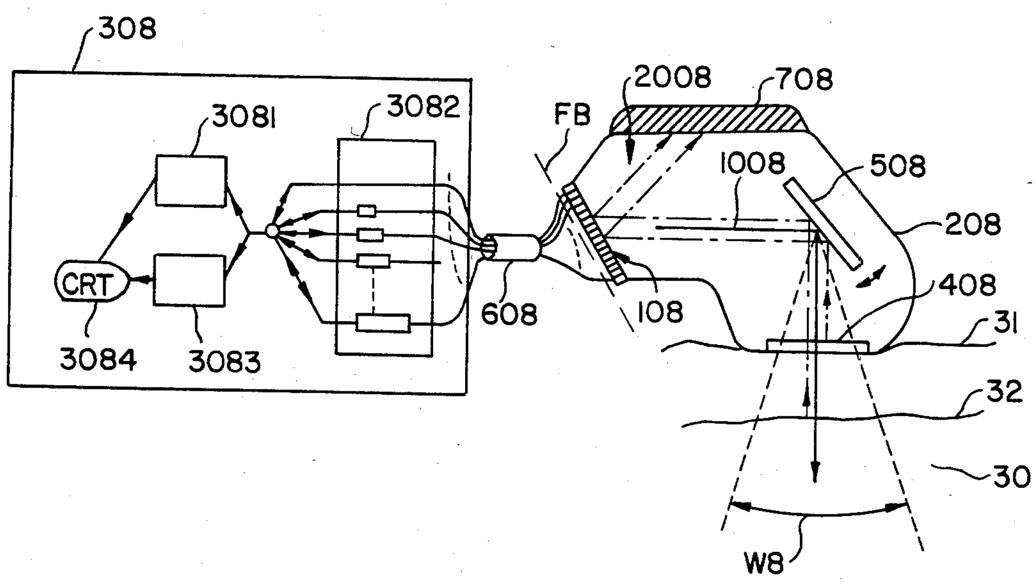
FIG. 8 shows schematically an embodiment of an ultrasonic diagnostic apparatus according to the present invention, having a phased array transducer and a scanning reflector.

FIG. 8 illustrates schematically an ultrasonic diagnostic apparatus applying the present invention. In the figure, 208 is a probe unit including a phased array transducer 108, an acoustic reflector 508, a window 408, and an acoustic absorber 708. 308 is a display equipment having driving unit 3081, phase control unit 3082, receive amplifier 3083, and display unit 3084. 608 is a cable connecting the display equipment 308 to the probe 208.

The driving unit 3081 generates pulse signals which have a specific repetition interval such as 200 Usec. To each element of transducer 108, a pulse is supplied through a phase control unit 3082 to a sound wave. The phase control unit 3082 contains a plurality of delay-lines, each delay line providing a delayed pulse for each transducer element 108, so that the transducer 108 generates an SS-beam 1008 whose main direction slants with respect to the normal to the surface of the transducer 108.

The elements of the transducer 108 are arranged in a plane F8, so that the surface of each element is arranged parallel to the plane F8 and the plane F8 does not meet at right angles the main direction of the SS-beam 1008. The reflector 508 is placed in the path of the SS-beam 1008 to reflect the SS-beam 1008 toward the target 30 and to oscillate for scanning. W8 shows a scanning angular width.

The received signals (pulses) which come from each transducer element pass through respective delay-lines, are added together, and fed to a receive amplifier 3083. The output of the receive amplifier 3083 is fed to a display unit 3084 where the received signals with the diagnostic information can be displayed.

The chain lines 2008 show the sound waves reflected back by the window 408 and the target 30. These reflected waves come back toward transducer 108, and the waves are reflected again by the surface of transducer 108. As the figure shows, they are absorbed by absorber 708. Thus, multi-reflection can be avoided in the apparatus of FIG. 8.

Figure 9:
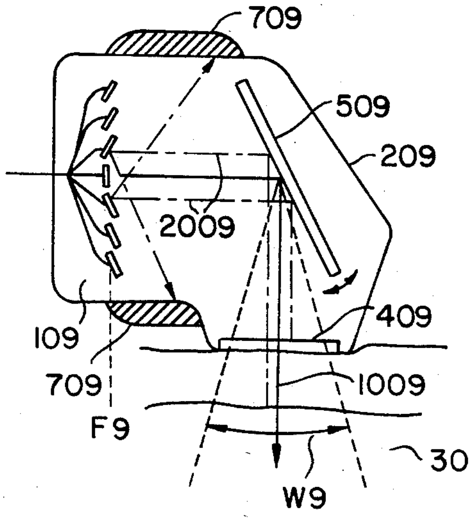
FIG. 9 shows schematically another embodiment of a probe unit by the present invention which has a phased array transducer and a scanning reflector.

FIG. 9 shows another embodiment of a probe unit having the transducer of the present invention. It is a phased array transducer but does not use a delay-line. In the figure, 209 is a probe unit, 109 is a phased array transducer which radiates the SS-beam 1009, 709 is an acoustic absorber, 509 is an acoustic reflector which oscillates for scanning the SS-beam 1009, 409 is a window, F9 is a plane on which each element of the transducer 109 is arranged, and 30 is a target 30.

In the case of FIG. 9, the direction of the normal to the plane F9 is along the direction of the SS-beam 1009 and each element of the transducer 109 is installed in plane F9, but the directions of the normals to the surfaces of the elements are different from the main direction of the SS-beam 1009. The elements are arranged to generate the SS-beam 1009 by applying the electric pulse signal to each element without using a delay-line.

By this arrangement of elements, the sound wave reflected by window 409 and the target 30 are reflected by the surface of the elements of the transducer 109 and are absorbed by the absorber 709 as shown in FIG. 9. The chain lines 2009 show these reflected waves.

The direction of each element surface is changed regularly by adding an equal incremental angle to each neighboring element in FIG. 9. However this is not important, since each element surface may take a direction randomly within a considerable angle which is determined as follows.

Figure 10:
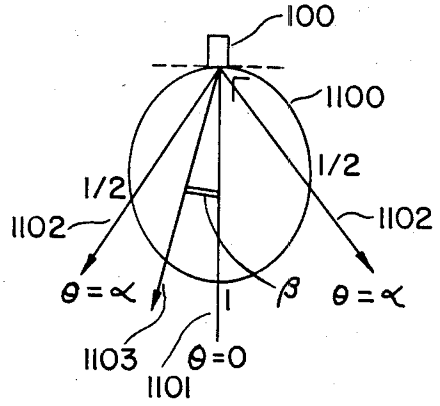
FIG. 10 shows schematically the directivity of a sound-beam formed by a transducer element.

FIG. 10 shows the directivity of the sound-beam of a transducer element with a sectional view of the pattern of the sound-beam. In the figure, 100 is a transducer element (element 100), 1100 is the directional pattern of an element's sound-beam, 1101 is the main direction 1101 of beam 1100 which has the maximum intensity of the sound field ($\theta=0$), and 1102 is a direction which has the half-value of the maximum intensity ($\theta=\alpha$, where, $\alpha$ is an angle of the half value direction).

Let the direction of the main SS-beam for the element 100 be the direction 1103 ($\theta=\beta$). In this case it can be seen that the sound intensity and a received signal of the SS-beam in an array transducer would become weak rapidly if $\beta$ is larger than $\alpha$.

Therefore, in transducer 109 of FIG. 9, it is desirable that an angle ($\beta$), between a direction of the normal to each element surface and the main direction of the SS-beam, be less than $\alpha$. Furthermore, it is desirable that the angle $\beta$ of each element is the same on the average, to have a uniform SS-beam while scanning.

Figure 11:
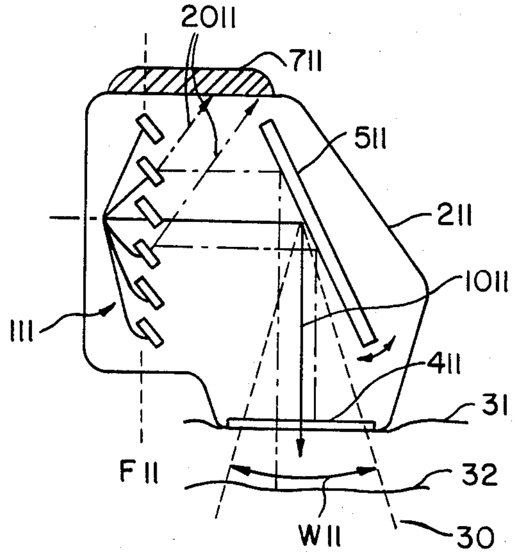
FIG. 11 shows schematically still another embodiment of a probe unit having a phased array transducer and a scanning reflector.

FIG. 11 shows a probe unit which uses also a phased array transducer technique without using a delay line.

In FIG. 11, 211 is a probe unit, 111 is a phased array transducer, 1011 is the main direction of the SS-beam, 711 is an acoustic absorber, 511 is an acoustic reflector, 411 is a window, F11 is a plane in which each element of the transducer 111 is arranged, and 30 is a target.

In the case of FIG. 11, the direction of the normal to the plane F11 is equal to the direction of the SS-beam 1011, however, each element of the transducer 111 is installed in the plane F11 so that the direction of the normal to each element surface is different from the direction of the SS-beam 2011 and the normal to the plane F11 is, all of the normals to the element surfaces being at the same angle which should be less than $\alpha$ as described in FIG. 10.

Therefore, an angular difference between the element surfaces and the plane F11 is selected so as to generate the SS-beam 1011 directed along the normal to the plane F11, by an electric pulse signal with a contrast phase (without using a delay line).

It will be clear that, by this arrangement of elements, the sound reflected from the window 411 or the target 30 will be reflected again by the element surfaces of the transducer 111, and is absorbed by the absorber 711 as shown in FIG. 11. The chain lines 2011 show these reflected waves.

Figure 12:
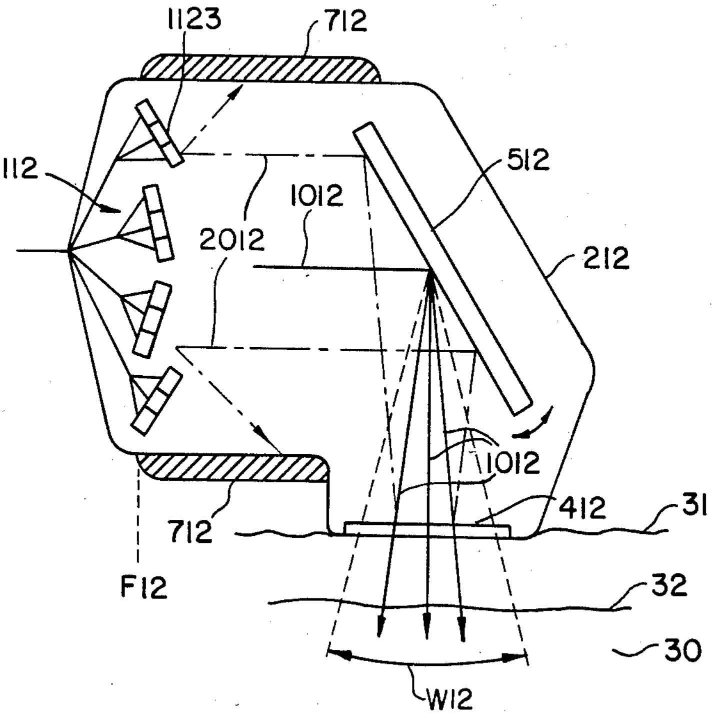
FIG. 12 shows schematically one more embodiment of a probe unit having a phased array transducer consisting of several sub-units of transducer elements.

FIG. 12 shows another embodiment of the probe unit 212 which also uses a phased array transducer without using a delay line.

In FIG. 12, 212 is a probe unit, 112 is a phased array transducer which is separated into several units of the transducer elements, that is, into sub-units 1123, 1012 is the main direction of the SS-beam, 712 is an acoustic absorber, 512 is an acoustic reflector, 412 is a window, F12 is a plane on which each sub-unit 1123 is arranged, and 30 is a target.

Transducer 112 is separated into several sub-units 1123. Each sub-unit 1123 is composed of less than ten transducer elements. By using each sub-units 1123, it is possible to cut the production cost of an array transducer such as the array transducers in FIG. 9 and 11, and to save man-hours for the assembly of the elements. Each sub-unit 1123 has its own plane in which the transducer elements are aligned, and generates an SS-beam of the sub-unit, and these SS-beams of the sub-units make up the SS-beam 1012. The direction of the normal to the plane of each sub-unit 1123 is different from the main direction of the SS-beam 1012, and the sub-units 1123 are supplied with electric pulse signals with the same phase without using a delay-line, and thus generate the SS-beam 1012. Scanning is performed by oscillating the reflector 512.

The chain lines 2012 show the reflected waves from the window 412 and the target 30, wherein the waves reflected by the surfaces of the units 1123 are absorbed by the absorber 712.

Figure 13:
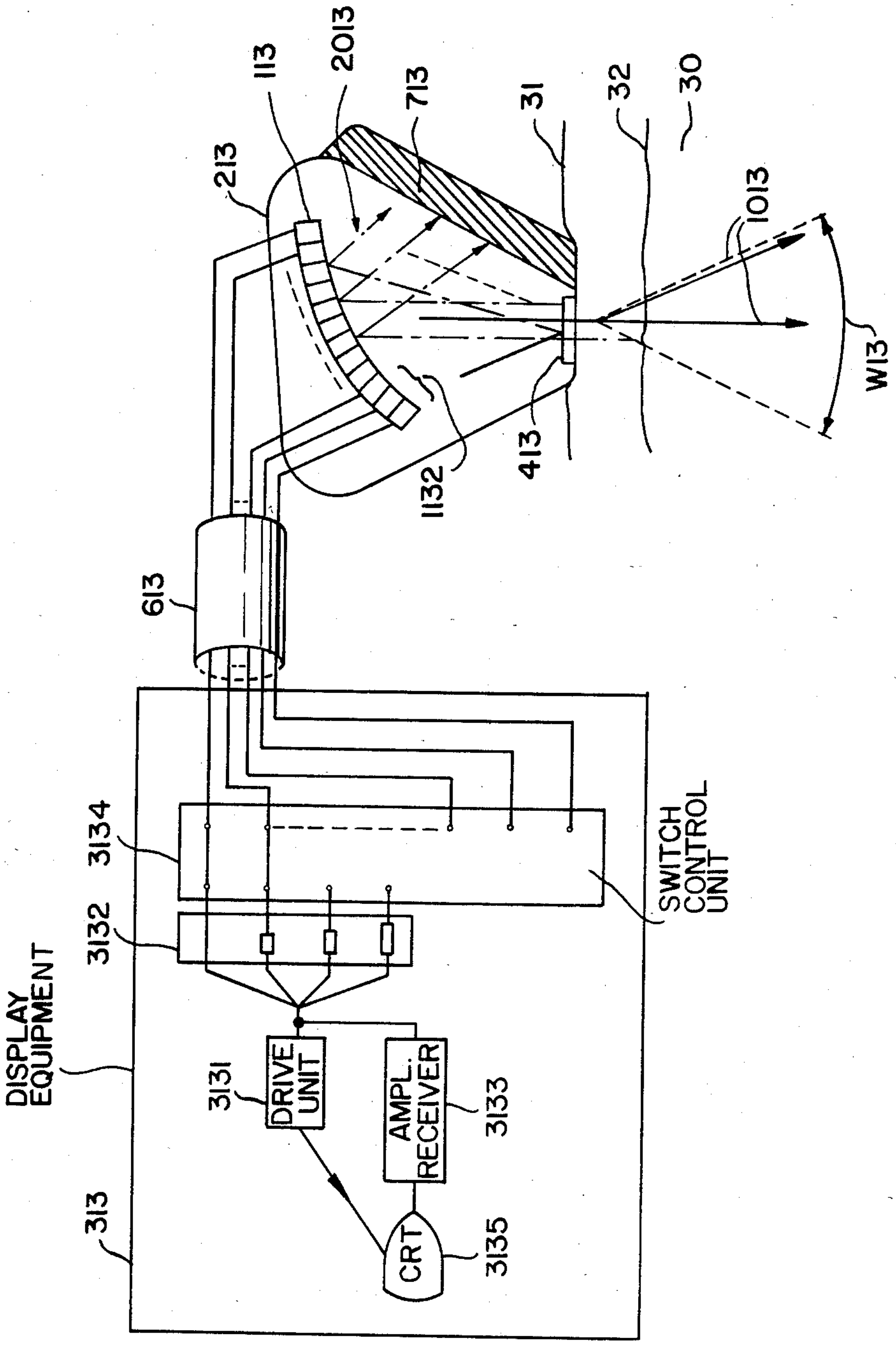
FIG. 13 shows schematically a further embodiment of an ultrasonic diagnostic apparatus having a probe unit in which a concave linear array transducer wherein provided but is the phase array technique is employed for shifting a synthesized sound beam.
Figure 14:
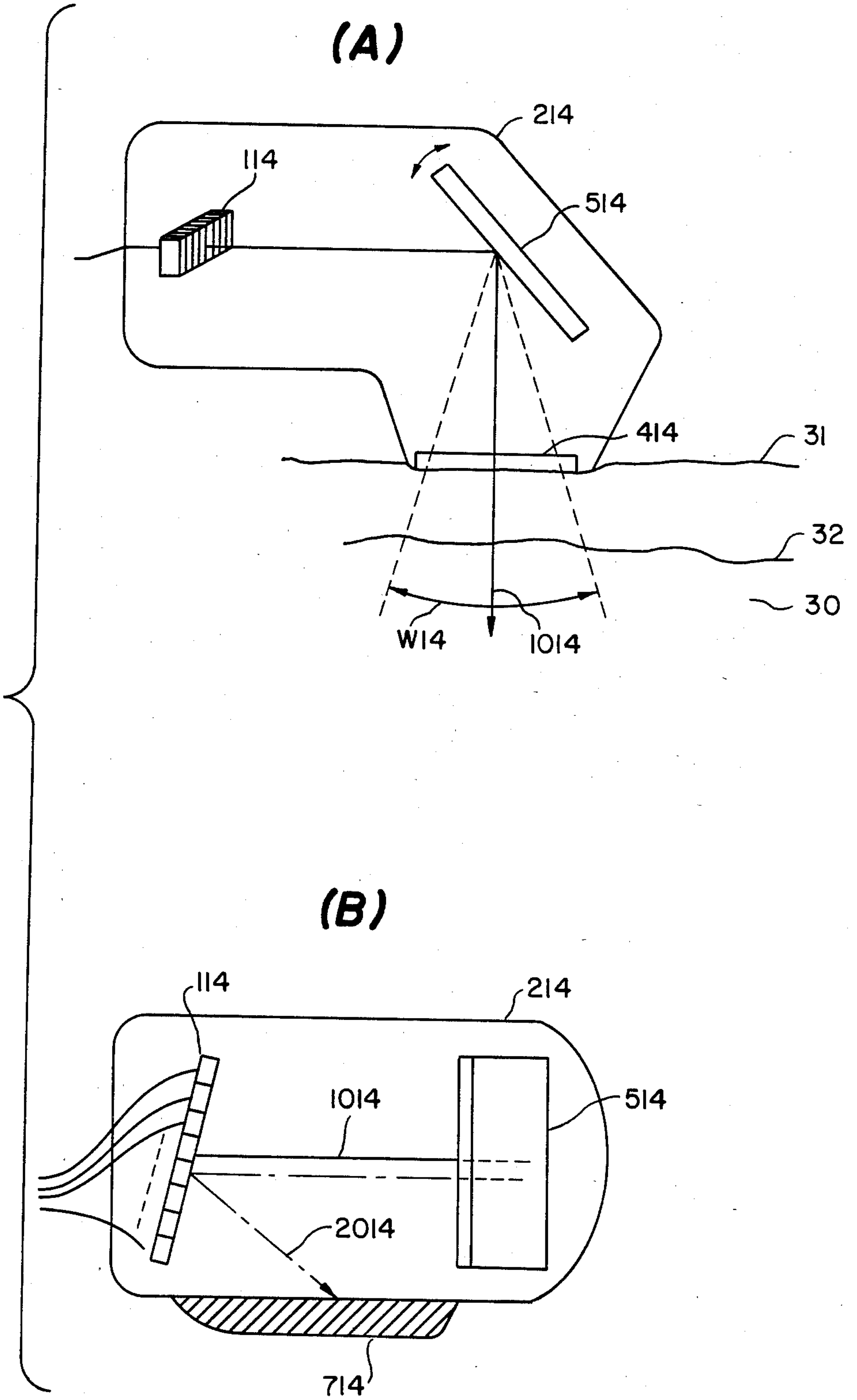
Figure 15:
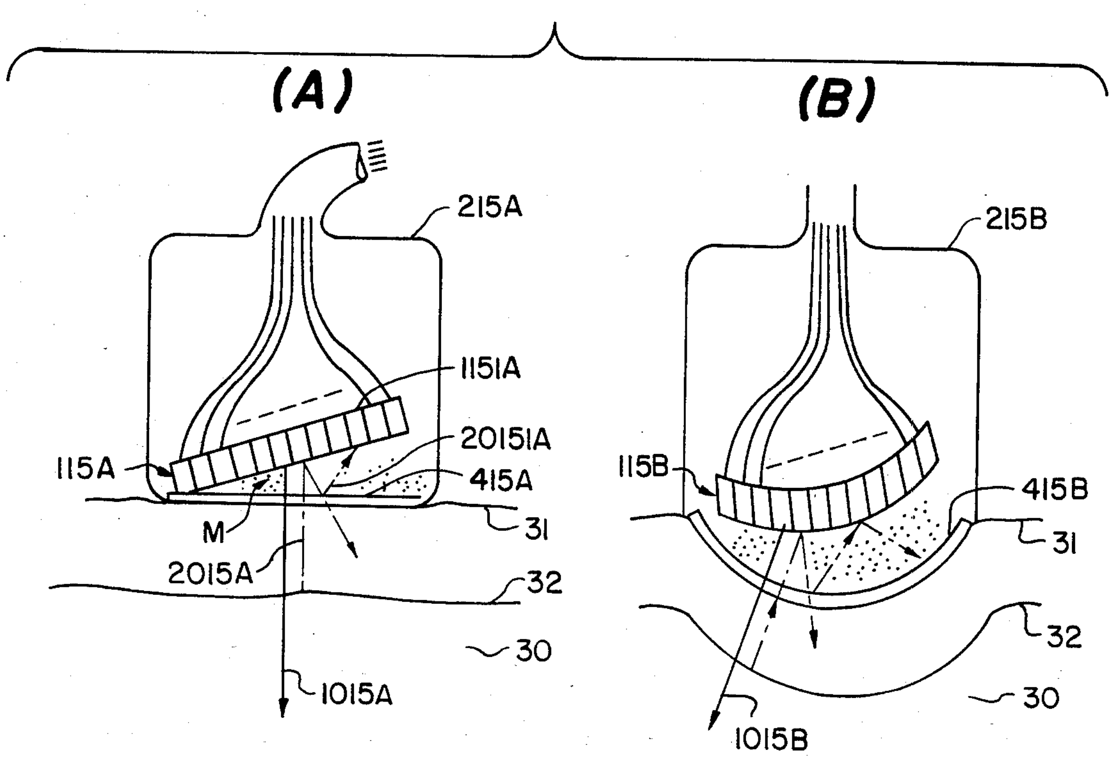
FIG. 15(A) shows schematically another preferred embodiment of a probe unit having a phased array transducer which is arranged in a plane that slants with respect to the surface of the window and the target.
FIG. 15(B) shows schematically an embodiment of a probe unit having a phased array transducer which is arranged in a convex plane, and installed so that the axis of the convex plane is slanted with respect to the surface of window and the target.

FIG. 13 shows a schematic diagram of an ultrasonic diagnostic apparatus which has a concave array transducer controlled by the combination of linear and a phase transducer technique. In the figure, 213 is a probe unit including a linear array transducer 113, a window 413, and an acoustic absorber 713. 313 is a display equipment having a driving unit 3131, a phase control unit (P-unit) 3132, receive amplifier 3133, a sequential switch control unit (S-unit) 3134, and a display unit 3135. 613 is a junction cable 613.

The function of display equipment 313 is the same as that of the display equipment 308 of FIG. 8, except for having a sequential switch control circuit. Transducer 113 is basically a concave linear array type transducer and sub-groups 1132 of elements 113 are activated to generate and scan the SS-beam 1013.

If the geometrical center of the concave face of a transducer 113 were placed around the window as in FIG. 5, multi-reflection would occur. However, in FIG. 13, the geometrical center is placed completely any from the window, and the main direction of the SS-beam is slanted by applying a phased array transducer technique, and therefore multi-reflection can be avoided.

A delay-line in the P-unit 3132 controls the phases of electric pulse signals for the elements of each sub-group 1132, while the multiplexer S-unit 3134 switches the connections of the delay-lines to the sub-groups 1132 by shifting the element one by one to provide linear array scanning.

Consequently, the transducer 113 generates an SS-beam 1013 and scans within an angular width W13, and then reflected waves 2013 from the window 413 or the target 30 are absorbed by the absorber 713 as shown in FIG. 13.

The distance between the transducer 113 and the target 30 varies when the excited part of the transducer 113 shifts on the array to scan the SS-beam 1013. Therefore, the difference in this distance should be compensated by the receiving unit 3133.

It should be noted that the apparatus in FIGS. 9, 11, and 12 have the merit of reduction in size and avoiding an cost of delay-line, but the apparatus also can be modified to have the features known in the prior art, such as a "variable aperture" or "dynamic focusing". Namely, details of the "variable aperture" and "dynamic focusing" techniques are described, for example, in "Expanding-aperture Annular Array" by D. R. Dietz, S. I. Parks, and M. Linzer, Center for Materials Science, National Bureau of Standards, Washington, D.C. 20234.

In each of FIGS. 8, 9, 11 and 12, the direction of the transducer array was contained in the scanning plane of the SS-beam. However, it is possible to set the direction of the transducer array on a slant to the scanning plane of the SS-beam. FIG. 14(A) shows a sectional elevation view and FIG. 14(B) shows a sectional plan view of such a case. In FIGS. 14(A) and (B), 214 is a probe unit, 114 is a phased array transducer, 514 is a reflector which oscillates for scanning, 714 is an absorber, 414 is a window, and 30 is a target. The SS-beam 1014 is generated on a slant by the transducer 114 and is scanned by the reflector 514 in an angular width W14. The wave 2014 reflected from the window 414 or the target 30 is reflected again by the surfaces of the elements of the transducer 114, and it is absorbed by the absorber 714. As a result, multi-reflection can be avoided.

FIGS. 15(A) and (B) show schematic diagrams of the probe unit having a phased array transducer which is installed on a slant with respect to the surface of the window and the target, to avoid multi-reflection.

In FIG. 15(A), 215A is a probe unit, 115A is a phased array transducer, 415A is a window, M is a medium to fill the space, and 30 is a target. 1015A is the main direction of the SS-beam, and 2015A shows a direction of the wave reflected from the window 415A and the target 30.

As can be seen in FIG. 15(A), the direction of an array is not parallel to the surfaces of the window 415A and the target 30, to avoid multi-reflection. When the transducer 115A generates the SS-beam 1015A and scans the target 30 through window 415A, the wave 2015A reflected from the surfaces of the window 415A and the target 30 is reflected by the surface of transducer 115A, and the reflected wave will be reflected again by the surfaces of window 415A or target 30. However, this second reflected wave 20151A arrives at the surface of the transducer element 1151A at a slant, so that the element 1151A does not transduce the second reflected wave 20151A into an electric signal, because the sensitivity of the transducer 115A decreases for such a slant angle. In this case, though multi-reflection occurs, the reflected waves do not cause multi-reflection contamination in the received signals as in FIG. 7(*d*).

FIG. 15(B) shows the similar case for a convex transducer. A probe unit 215B has also a phased array transducer 115B and the elements of the transducer 115B are arranged on a convex face. This transducer 115B is installed in probe 215B so that the axis of the convex face is slanted toward the surface of the window 415B and the target 30. The acoustically transmissible medium M fills the space between the transducer 115B and the window 415B. When transducer 115B generates the SS-beam 1015B and scans the target 30 through the window 415B as shown in FIG. 15(B), for the same reasons mentioned above, the effect of multi-reflection can be avoided.

Figure 16:
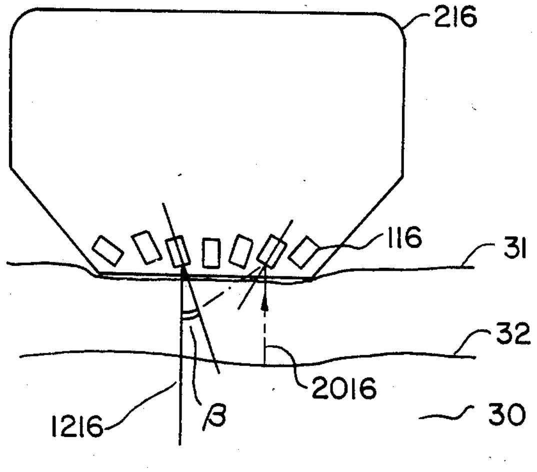
FIG. 16 shows schematically an embodiment of a probe unit having a phased array arranged in one plane parallel to the surfaces of a window and a target, but the surface of each element of the transducer is not parallel to them.
Figure 17:
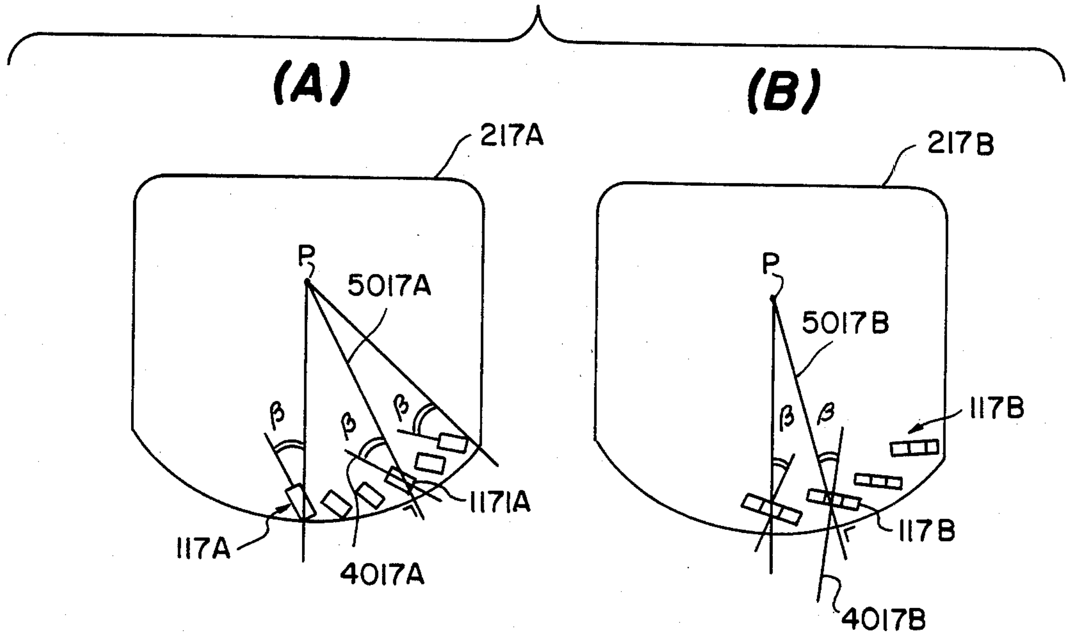
FIG. 17(A) shows schematically an embodiment of a probe unit having a convex linear array transducer, in which the normal direction to the surface of each element of the transducer does not meet the convex face at a right angle.
FIG. 17(B) shows schematically an embodiment of a probe unit having a concave linear array transducer which is separated into several sub-units, in which normal direction to each sub-unit of the transducer does not meet the convex face at right angles.
Figure 18:
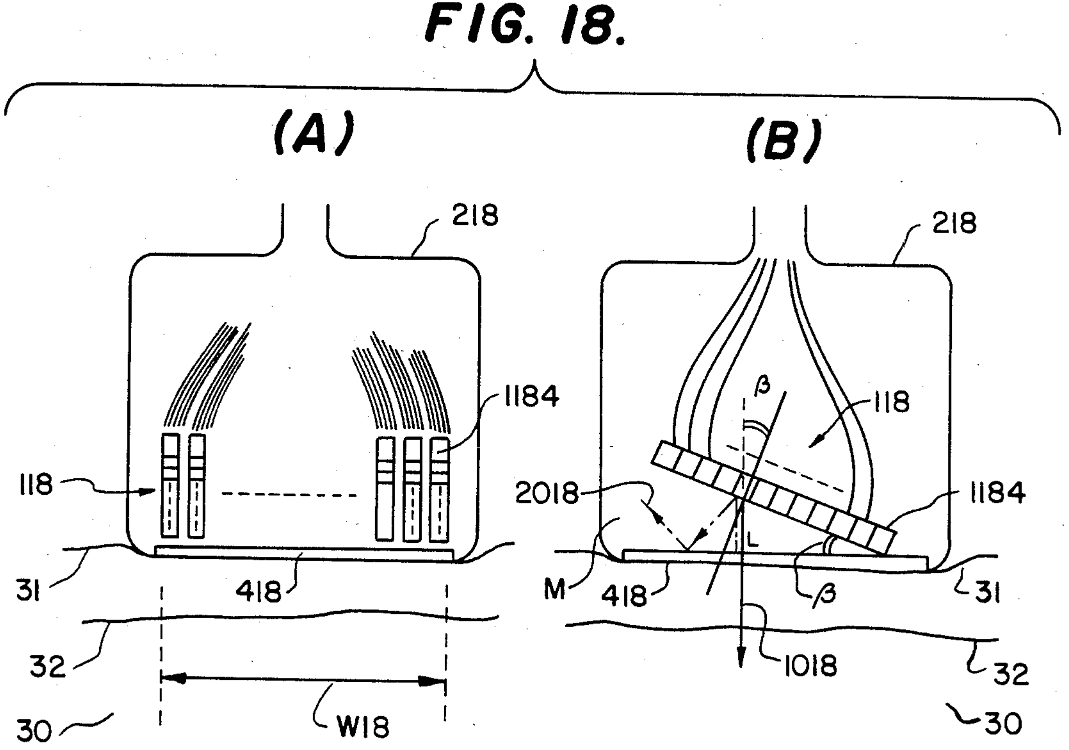

FIG. 16 shows another embodiment of a probe unit 216 which has a phased array transducer 116, arranged on the wall surface of the probe 216, but the direction of the normal to each element surface of the transducer 116 is different from the direction of the SS-beam 1016 generated by a phased array technique, so that the reflected wave 2016 does not cause multi-reflection.

The directions of the element surfaces of the transducer 116 can be set irregularly. The direction of each transducer element is required to avoid multi-reflection with $\beta$ less than $\alpha$ for each element as mentioned in connection with FIGS. 9 and 10.

FIGS. 17(A) and (B) show other embodiments of a probe unit 217A and B, having a convex array transducer 117A and B, to which a linear array transducer technique is applied. It can be said that probes 217A and B are the modified forms of probe 106 in FIG. 6 to avoid multi-reflection.

In FIG. 17(A), only a half of the array elements of the transducer 117A are shown, for simplicity. 1171A is an element of the transducer, P is the center point of a convex face on which the elements 117A are arranged, 5017 is the normal to the surface of the convex face, and 4017 is the normal to the surface of element 1171A.

As FIG. 17(A) shows, the direction of the surface of each element 1171A is determined so that 4017A makes an angle $\beta$ with respect to 5017A to satisfy the value mentioned in connection with FIG. 10.

FIG. 17(B) shows a case similar to that of FIG. 17(A), in which the transducers 117B are grouped and separated into sub-units 1173. The SS-beam of each sub-unit 1173 is scanned by a linear array transducer technique.

In FIG. 17(B), the transducer 117B is shown for only a half of the transducer 117B, for the sake of simplicity. P is the center point of a convex face on which the sub-units 1173 are arranged, 5017B is the normal to the convex face, and 4017B is the normal to the surface of each sub-unit 1173. Each sub-unit 1173 is installed in the same convex face, and the normal direction of the surface of each sub-unit 1173 is determined so that 4017B makes an angle $\beta$ with respect to the normal 5017B, to satisfy the value mentioned in in connection with FIG. 10.

FIGS. 18(A) and (B) show schematic diagrams of a probe unit 218 having an array transducer which has a two-dimensional structure. FIG. 18(A) is a sectional front view and FIG. 18(B) is a sectional side view of the probe unit.

In FIGS. 18(A) and (B), 218 is a probe unit, 118 is a transducer, 1184 are phased array elements (P-elements), 418 is a window, M is an acoustic transmissible medium, 30 is a target, 1018 is the main direction of the SS-beam of the P-elements 1184, 2018 is the wave reflected from the surface of window 418 and the target 30, $\beta$ is an angle between the direction of the normal to the surface of the P-elements 1184 and SS-beam 1018, and the W18 is a scanning angular width indicated by the dotted lines.

The SS-beam 1018 is generated by P-elements 1184 using a phased array technique. A scan is achieved by applying a linear array technique to each P-element one by one.

Angle $\beta$ should be selected so that multi-reflection can be avoided as described in FIG. 15(A), and it is desirable that $\beta$ be less than $\alpha$ as described in connection with FIG. 10.

It will be clear to one skilled in the art that, in the apparatus which has a probe unit as in FIGS. 15(A) to 18(B), the techniques of a "variable aperture" or a "dynamic focusing" can be applied as mentioned before.

The description explained the method and the apparatus to avoid multi-reflection by deflecting the reflected sound wave from the surface of the transducer by means of rearrangement of the orientation of the surfaces of the array transducer elements. In other words, it can be said that the above method is accomplished by applying an array transducer technique.

Next, the second method to avoid multi-reflection will be disclosed. This applies the acoustic phase technique, and the method can be applied not only to the apparatus using an array transducer but also to the apparatus using a single transducer element.

The phase technique applied here has two varieties, the acoustic matching layer technique and the acoustic matching surface technique. FIGS. 19 to 27 illustrate the former, and FIGS. 28 to 32 illustrate the latter.

Figure 19:
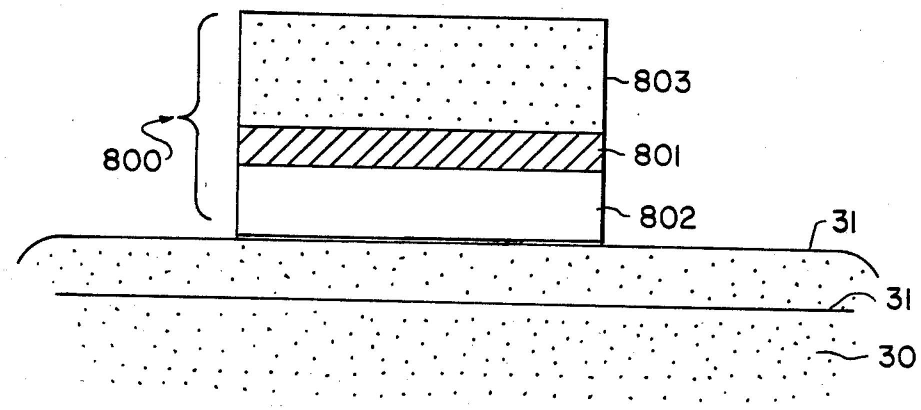
FIG. 19. (PRIOR ART)
FIG. 19 shows schematically a prior art electro-sound transducer element structure.
Figure 20:
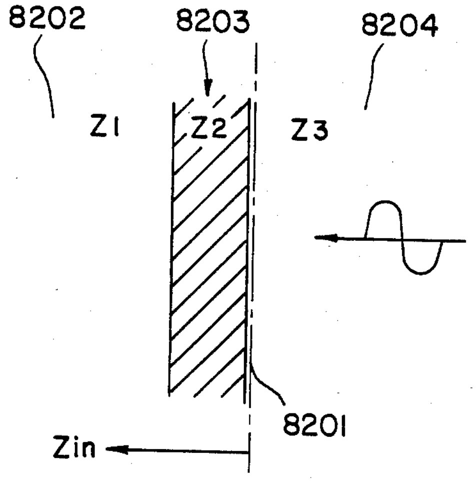
FIG. 20 shows schematically an illustrating diagram for the basic concept of acoustic phase in an acoustic medium.

FIG. 19 illustrates the structure of a prior art electro-sound transducer, and FIG. 20 is a diagram to explain the basic concept of acoustic phase in an acoustic medium.

In FIG. 19, element 800 consists of a piezo-electric device 801, an acoustic matching layer 802, and acoustic damper 803. Generally, device 801 has a front and a back face. The sound wave is radiated from and received at the front face. The layer 802 is attached to the front face of device 801, and a front face of layer 802 is contacted to a target 30 directly. The damper 803 is attached to the back face of device 801 to absorb backward radiated sound waves.

The thickness of layer 802 is approximately a quarter of the wavelength of the sound. The layer 802 is usually applied to provide impedance matching so as to radiate a sound wave effectively into a target 30 in a short pulse period. More detail is disclosed in Japanese Patent Publication No. tokukosho 55-33020.

As element 800 is a prior art element, sound waves radiated forward are reflected at the boundary faces such as the front face of layer 802, the a target surface 31 and the boundary 32 between different tissues in the target. The reflected sound waves are reflected again by the front face of the device 801 causing multi-reflection (front multi-reflection). On the other hand, a part of the reflected sound waves pass through element 801, and are reflected by the back face of device 801 causing another multi-reflection (back multi-reflection). This is due to mismatch of the impedances of the layer 802 and the damper 803 to that of the device 801.

To avoid front multi-reflection, layer 802 is modified so that the acoustic impedances looking into the layer from both its surfaces are equal to the impedance of the medium attached to the respective surface, and the inner impedance of the layer is varied linearly from one end to the other. This is detailed more in Japanese Patent Publication No. tokukoshoo 58-18095.

The present invention, therefore, avoids front and/or back multi-reflection, using a single or a plurality of the acoustic matching layers.

FIG. 20 illustrates a fundamental principle of acoustic reflection. 8202, 8203, and 8204 are acoustic media having acoustic impedances Z1, Z2, and Z3 respectively. Suppose that medium 8202 and 8204 have sufficient thickness and uniformity to consider that there is no reflection, but medium 8203 has a thickness of a quarter wavelength of sound. In this condition, the input acoustic impedance Zin at the boundary face 8201 can be expressed as:

$$Zin=(Z2)^2/Z1 \quad (1).$$

It can be said that the sound pressure of a wave reflected toward the medium 8204 at the boundary face 8201 will be minimized if Zin in the equation (1) satisfies the following equation (2):

$$Zin=Z3 \qquad (2).$$

With such a condition, the phase of the wave reflected at the boundary surface 8201 is opposite to that of the reflected wave reflected by a boundary surface between media 8203 and 8202, so that the waves reflected by both boundary faces are canceled out.

Figure 21:
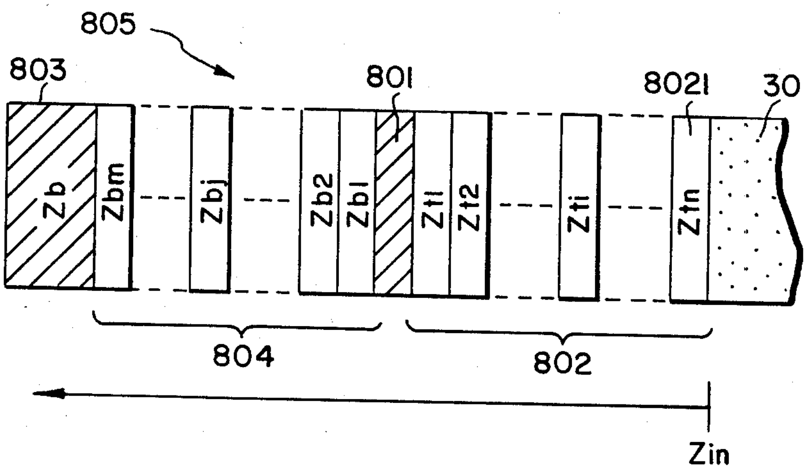
FIG. 21 shows schematically a typical transducer element structure of the present invention having front acoustic matching layers (F-layer) and back acoustic matching layer (B-layer) on the front and back faces of a piezo-electric device.
Figure 22:
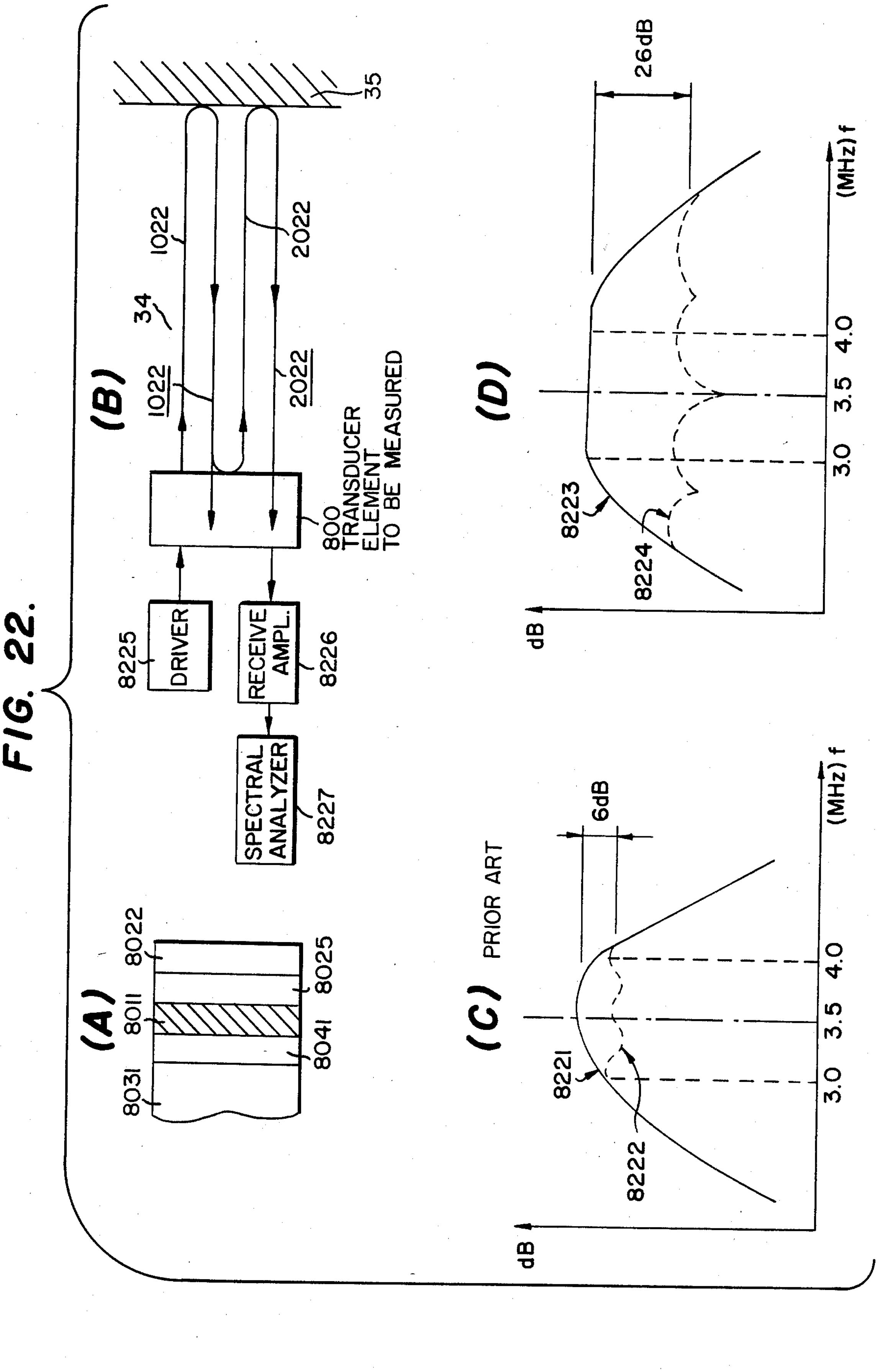

FIG. 21 illustrates a typical transducer element of the present invention having the acoustic layers on both faces of a piezo-electric device. In this figure, 805 is a transducer element, 30 is a target, 801 is a piezo-electric device, 802 is a plurality of front acoustic matching layers including a layer 8021 contacted to the target 30, 803 is an acoustic damper, and 804 is a plurality of back acoustic matching layers.

As shown in FIG. 21, the F-layer 802 has n layers, each with a thickness equal to a quarter of the wavelength of sound, and then layers have acoustic impedance Zt1, Zt2, - - - , and Ztn. The B-layer 804 has m layers, each with a thickness equal to a quarter of the wavelength of sound and with acoustic impedances Zb1, Zb2, - - - , and Zbm. Zb is the acoustic impedance of the damper 803, and Zt is the acoustic impedance of the target 30. In this case, the input impedance Zin at the front face of the element 805, looking from the target 30, is given by:

$$\ln Zin = 2\sum_{i=0}^{n}(-1)^{(n-i)}\ln Zti + 2\sum_{j=0}^{m}(-1)^{(n+j-1)}\ln Zbj + (-1)^{(m+n)}\ln Zb, \qquad (3)$$

where, Zti(i=0)=Zbj(J=0)=1.

Thus, sound waves reflected toward the target 30 at the front face of the element 805 will be minimized if Zin in the equation (3) satisfies the following equation (4):

$$\ln Zin=\ln Zt \qquad (4).$$

FIGS. 22(A) to (D) involve an embodiment of this type transducer. FIG. 22(A) is a cross sectional view of the transducer illustrating the structure of the element, FIG. 22(B) shows the measuring system used to test multi-reflection of the transducer element, FIG. 22(C) is a measured result showing the characteristics of a prior art transducer element, and FIG. 22(D) is the measured result of a transducer element according to the present invention.

In FIG. 22(A), 8011 is a piezo-electric device, 8022 and 8023 are front acoustic matching layers (F-layers, the F-layer 8022 contacts to a target, 8041 is a back acoustic matching layer (B-layer), and 8031 is an acoustic damper).

In FIG. 22(B), 800 is a transducer element to be measured, 35 is a completely reflecting target for the sound wave, 34 is an acoustic medium of pure water filled between the element 800 and the reflector 35, 8225 is a driver which drives element 800 to radiate sound waves, 8226 is a receiver which receives and amplifies the electric output signal from element 800, and 8227 is a spectral analyzer (spe-ana) which spectrally analyzes the electric signals received by receiver 8226.

This measuring system has been provided for testing the multi-reflection of various transducers. Driver 8225 drives element 800, by an electric pulse signal, to radiate a sound wave 1022. The radiated sound wave 1022 is reflected by the target 35, so that the reflected sound wave 1022, which is called the primary reflected wave, returns to element 800 which produces a receiving signal. However, a part of the reflected sound wave 1022 is reflected again by the surface of element 800, sending the sound wave 2022 toward the target 35. The sound wave 2022 is again reflected by the target 35, so that the reflected sound wave 2022, which is called a secondary reflected wave, returns to the element 800, producing again a receiving signal. This will occur repeatedly to cause multi-reflection.

FIG. 22(C) shows the spectral intensity of the reflected waves. In the figure, curve 8221 shows the intensity of the primary reflected wave 1022. The dotted curve 8222 shows the spectral intensity of the secondary reflected wave 2022, measured with a prior art transducer element such as shown in FIG. 19. This figure shows that the prior art element has only 6 dB difference between the primary and secondary reflected waves in the 3.5 MHz sound frequency region.

FIG. 22(D) shows a measured result for an element shown in FIG. 22(A), having impedance at 3.5 MHz are as follows:

$34.0\times10^6$ Kg/s.m for device 8011,
$2.0\times10^6$ Kg/s.m for F-layer 8022,
$8.5\times10^6$ Kg/s.m for F-layer 8023,
$12.8\times10^6$ Kg/s.m for B-layer 8041,
$7.5\times10^6$ Kg/s.m for damper 8031, and this figure shows that the difference is as much as 26 dB. Therefor, it can be said that the transducer element shown in FIG. 22(A) reduces multi-reflection more than 20 dB compared to the prior art transducer.

Figure 23:
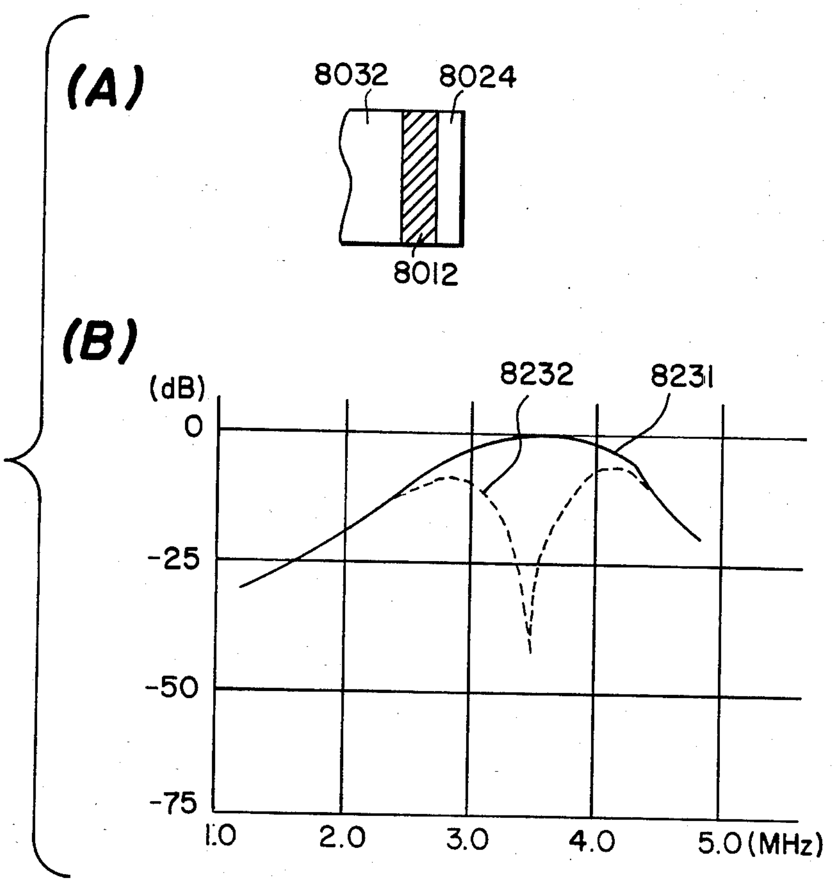
FIG. 23(A) shows the structure of the transducer element.
FIG. 23(B) shows its measured result.
Figure 24:
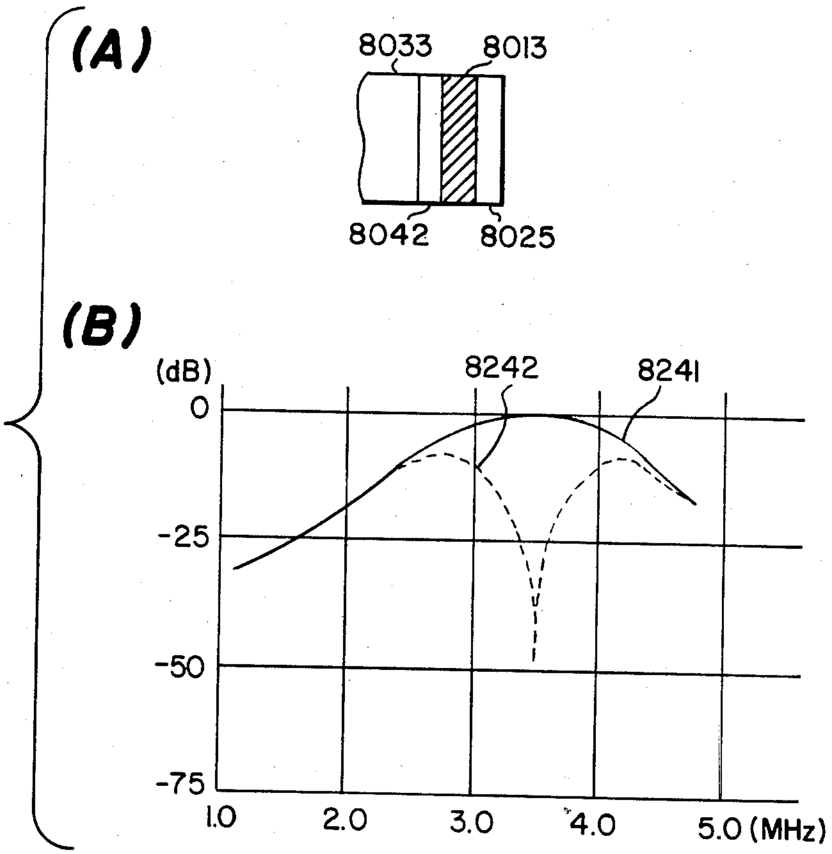
Figure 25:
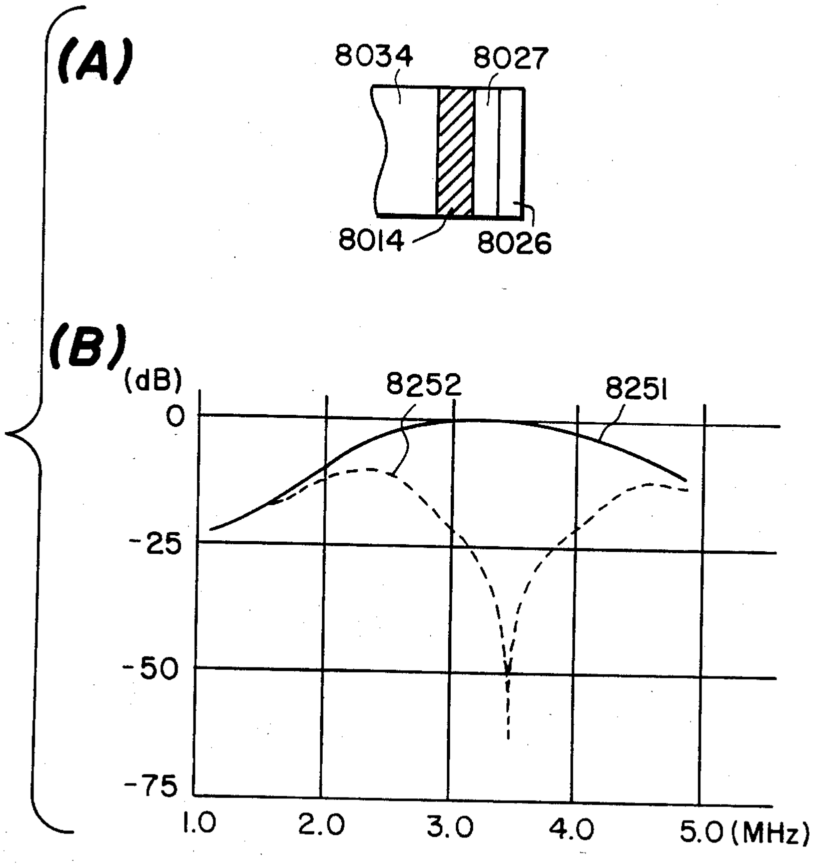
Figure 26:
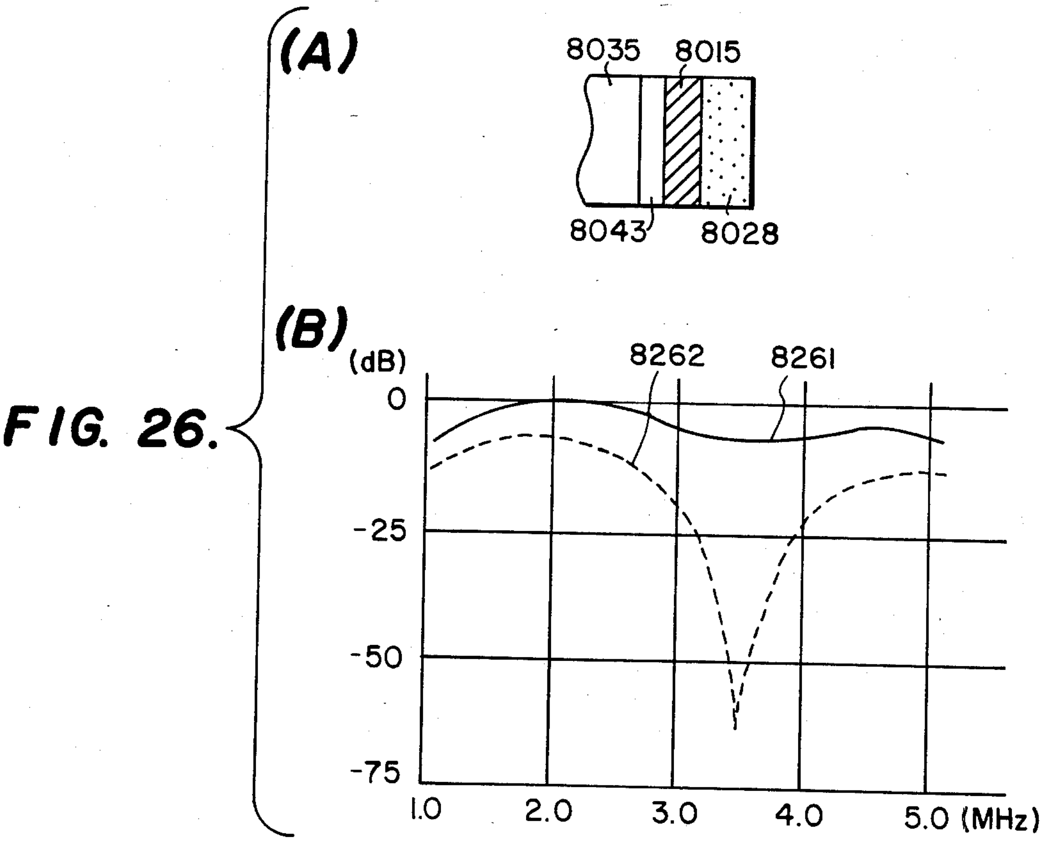

FIGS. 23(A) to 26(B) show the results of measurement, carried out by the device shown in FIG. 22(B), comparing the primary and secondary reflection of transducers, for some other embodiments of the present invention. In these figures, measurement was carried out for a frequency region of 3.5 MHz. The impedance of the piezo-electric device of each figure was equal to that of 8011, but the impedances of the other sections shown in each of the figures were as follows:

in FIG. 23,
$34.0\times10^6$ Kg/s.m for device 8012,
$3.8\times10^6$ Kg/s.m for F-layer 8024,
$11.5\times10^6$ Kg/s.m for damper 8032;

in FIG. 24,
$34.0\times10^6$ Kg/s.m for device 8013,
$3.8\times10^6$ Kg/s.m for F-layer 8025,
$9.4\times10^6$ Kg/s.m for B-layer 8042,
$7.5\times10^6$ Kg/s.m for damper 8033;

in FIG. 25,
$34.0\times10^6$ Kg/s.m for device 8014,
$2.0\times10^6$ Kg/s.m for F-layer 8026,
$8.4\times10^6$ Kg/s.m for F-layer 8027,
$21.8\times10^6$ Kg/s.m for damper 8034; and in FIG. 26, an equal impedance was attached to both end surfaces of the F-layer 8028,
$34.0\times10^6$ Kg/s.m for device 8015,
$3.0\times10^6$ Kg/s.m for B-layer 8043,
$7.5\times10^6$ Kg/s.m for damper 8035.

In the above experiments the various acoustic impedances were realized by selection of the material forming the layers from the following materials:

(1) synthetic resins such as polyurethane, nylon, and epoxy resin for impedances from $2.0\times10^6$ to $3.2\times10^6$ Kg/s.m;

(2) materials such as glass, crystal, and quartz for impedances from $10.0\times10^6$ to $13.5\times10^6$ Kg/s.m; and (3) synthetic resin added to metal powder such as of aluminum or iron, for varying impedances up to $20\times10^6$ Kg/s.m by changing the quantity of the added metal powder. Furthermore, this synthetic resin is useful for the acoustic matching layer, because it is also an adhesive material, so that the layer can be attached to the piezo-electric device without using other adhesive material which might deteriorate transducer performance.

A criterion for estimating the above multi-reflection test can be obtained from the following experiment.

Figure 27:
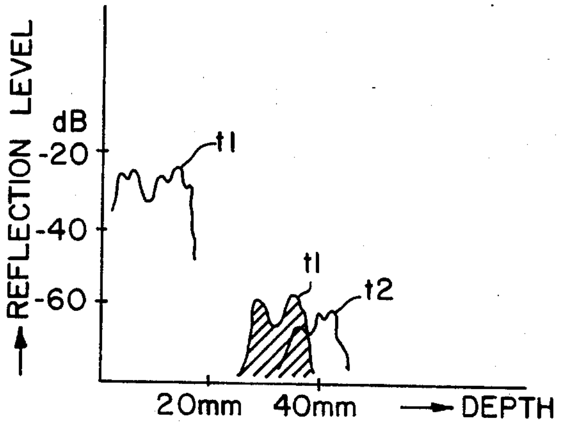
FIG. 27 shows schematically an experimental result of a prior art transducer element indicating the level of sound echoes, and its reflected sound waves by multi-reflection using the heart of a human body as a target.

FIG. 27 shows an experimental result for a prior art transducer element indicating the level of sound echoes and of the reflected sound by multi-reflection, using the heart of the human body as a target. In the figure, sound echoes and reflected sound are shown on the vertical line and depth of each object's location from the skin surface is shown on the horizontal line.

In this experiment, it has been determined that detection of a bulkhead in the heart, located about 40 mm inside the skin, tends to be disturbed by multi-reflection owing to tissue within about 20 mm from the skin.

In FIG. 27, t1 is the level of the sound echo from the tissue, t2 is the sound echo from the bulkhead, and t1 is the level of the reflected sound by multi-reflection of the tissue. This figure shows a disturbance of t1 for t2 detection.

From this figure, it can be understood that the reflection level of the tissue is approximately −25 dB, and the reflection level of the bulkhead is −60 dB. Therefore, the reflection factor (R) should be less than −10 dB in accordance with the following equation (5):

$$(-25\text{ dB})\times2+R<-60\text{ dB} \quad (5).$$

The reflection factor of the prior art transducer is from −6 dB to −10 dB, and in experience to date, this has caused poor acoustic tomograms as a result of multi-reflection. As can be seen from the foregoing figures, the reflection factors are obviously less −15 dB at 3.5 MHz. So, the transducers of the above embodiments are very effective for avoidance of this multi-reflection.

The above embodiments are applications of the acoustic matching layer technique. Next, a third method to avoid the multi-reflection will be disclosed. This method applies an acoustic matching surface technique.

Figure 28:
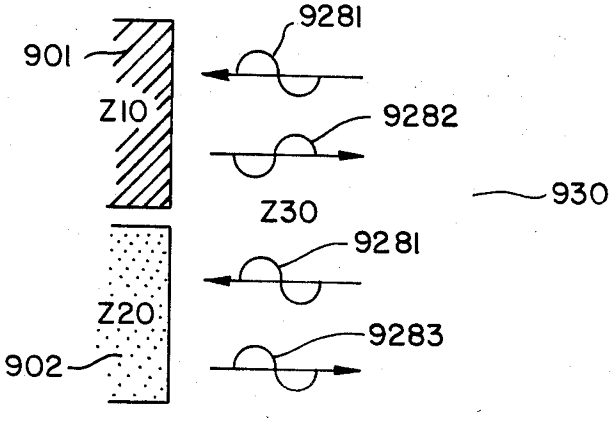
FIG. 28 shows an illustrating diagram for a basic concept of a phase relation of incident and reflected sound waves at the boundary faces of different acoustic mediums.
Figure 29:
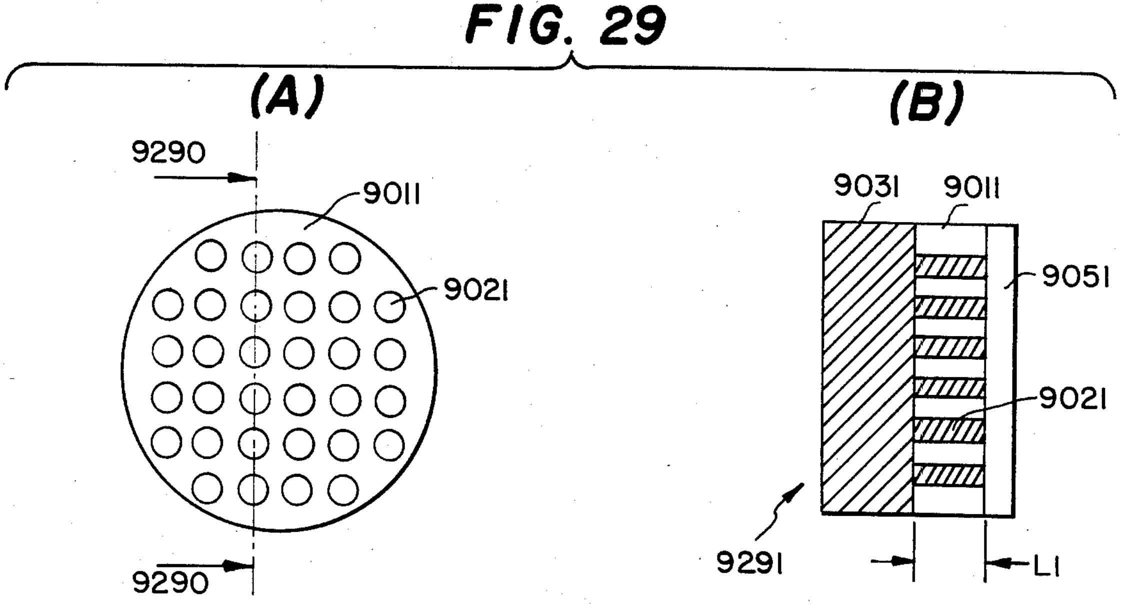

FIG. 28 illustrates a phase relation of incident and reflected sound waves at the boundary face of an acoustic medium. In the figure, 901, 902, and 930 are acoustic media which have acoustic impedance Z10, Z20, and Z30, respectively. 9281 shows an incident sound wave arriving at the faces of medium 901 and medium 902 through medium 930. 9282 shows a sound wave reflected by the face of medium 901, and 9283 shows a sound wave reflected by the face of medium 902.

In this condition, the reflection factor R13 looking from the medium 930 toward the medium 901 is derived as:

$$R13=\frac{Z10-Z30}{Z10+Z30}. \quad (6)$$

From this equation, R13>0, if Z10>Z30. This means that a reflected sound wave (9283) has the same phase as the incident sound wave 9281. On the other hand, R13>0 if Z10>Z30. This means that a reflected sound wave (9282) has the reverse phase with respect to the incident sound wave 9281.

For medium 902, the reflection factor R23 looking from medium 930 toward medium 902 is derived as $$R23=\frac{Z20-Z30}{Z20+Z30}. \quad (7)$$

From the above equations (6) and (7), it is possible to make the reflected sound waves 9282 and 9283 cancel out each other, under the following conditions:

Z20>Z30, when Z30>Z10;

Z20<Z30, when Z30<Z10;

|R13|=|R23|.

More generally, the following equation can be obtained for cancellation of the reflected sound waves:

$$S10\times R13=S20\times R23, \quad (8),$$

where,

S10: area of 901,

S20: area of 902,

R13: reflection factor of 901 to 930, and

R23: reflection factor of 902 to 930.

Furthermore, if we assume that:

901 is a piezo-electric device (device);

902 is a medium selected to satisfy a specific condition which will be described later with respect to equation (9);

930 is common target for 901 and 902 such as water or the human body;

the faces of 901 and 902 are arranged on one plane facing toward 903;

the face of the device 901 may be considered to be divided into a plurality of divided faces;

the face of the medium 902 is divided into a plurality of divided faces; and the divided faces of the device and medium are mixed uniformly, the relation of area and reflection factor shown by equation (8) is generalized by:

$$Sa\times Ra+Sb\times Rb=0 \quad (9),$$

where,

Sa: total area of divided faces of the device;

Ra: substantial reflection factor of the device;

Sb: total area of divided faces of the medium; and

Rb: substantial reflection factor of the medium.

In the above generalization, it has been assumed that, the "device" and "medium" are made of respective single materials. But a case may be considered in which any of the device and medium are made from more than one kind of material. The spirit of the invention extends to such a case. For such a case the equation (9) can be applied, except that the reflection factor is to be taken as the substantial reflection factor for the respective "device" or "medium" parts.

FIGS. 29(A) and (B) illustrate an embodiment of the present invention utilizing the acoustic matching surface technique. FIG. 29(A) is a front view of a transducer, and FIG. 29(B) is a sectional view of the transducer element 9291 viewed at line 9290 in FIG. 29(A). In the Figures, 9011 is a piezo-electric device, 9021 is an acoustic medium, 9031 is an acoustic damper, 9051 is coating material, and L1 is the thickness of device 9011 along the direction of the incident sound wave.

In FIGS. 29(A) and (B), which show an embodiment of the present invention, device 9011 has a number of holes distributed uniformly on its face, and medium 9021 is filled into these holes. Coating 9051 coats the front face of device 9011, the front face of coating 9051 is contacted to a target to be diagnosed, and the damper 9031 is attached to the back face of the device 9011.

The reflected sound wave at the front face of the element 9291 can be canceled and multi-reflection can be avoided, when the acoustic impedance and surface area of each material satisfy the following equation (10):

$$S11 \times \frac{Zc - Z14}{Zc + Z14} = S12 \times \frac{Z14 - Z12}{Z14 + Z12}, \tag{10}$$

where;

S11: total area of the front face of the device 9011 except S12,

S12: total area of the holes at the front face of the device 9011,

Zc: acoustic impedance of the device 9011,

Z12: acoustic impedance of the medium 9021, and

Z14: acoustic impedance of the coating 9051.

Figure 30:
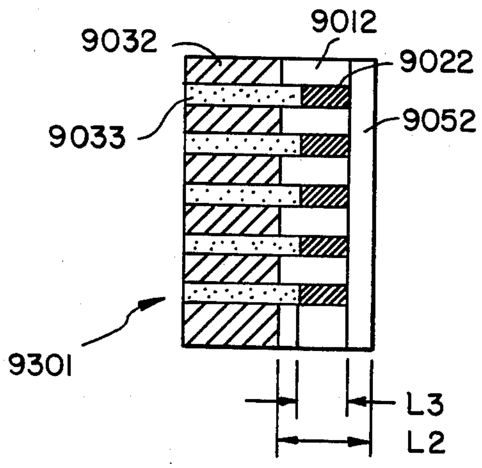
FIG. 30 shows schematically a sectional side view of another embodiment of the transducer element structure having holes and different acoustic dampers attached to the back face of a piezo-electric device to avoid front and back multi-reflections.
Figure 31:
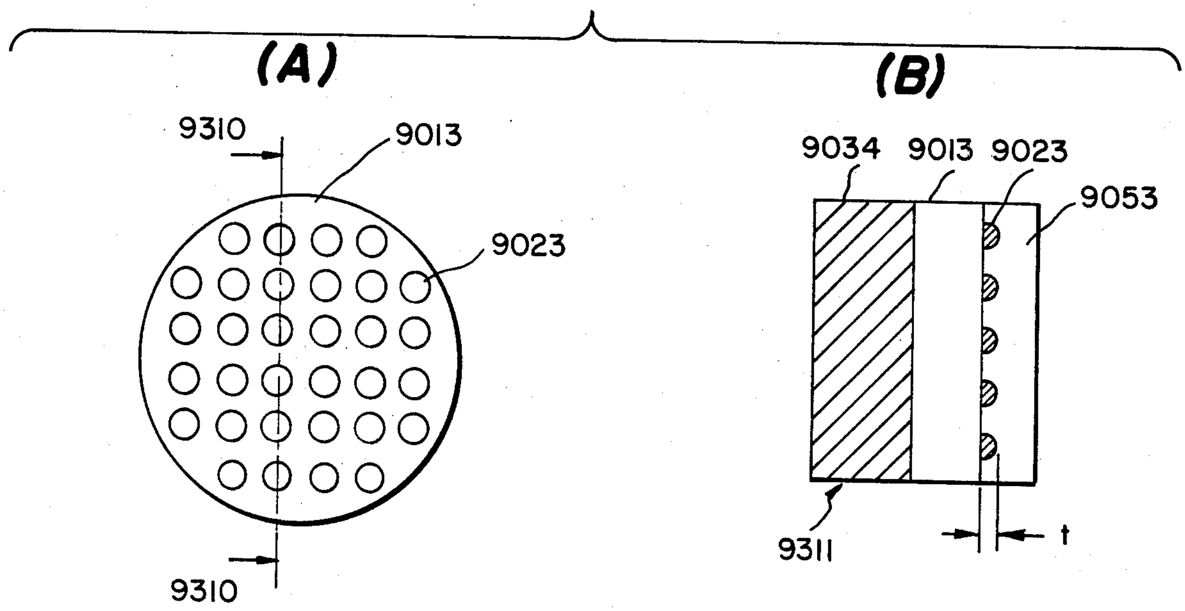

FIG. 30 shows a sectional side view of a transducer 9301 which modifies the transducer 9291 in FIGS. 29(A) and (B), so that reflected waves at the back face of a piezo-electric device also can be canceled. In the figure, 9301 is a transducer element, 9012 is a piezo-electric device having a number of holes distributed uniformly on its face, 9022 is an acoustic medium filled into the holes, 9052 is a coating material, 9032 is an acoustic damper for device 9012, 9033 is an acoustic damper for medium 9022, and L2 and L3 are the thickness of device 9012 and of the medium 9022, respectively, along the direction of the incident sound wave.

Avoidance of back multi-reflection of element 9301 can be achieved by the following structure:

the D-damper 9032 is attached to the back face of the device 9012, the M-damper 9033 is attached to the back face of the medium 9022, the thickness L2 of the device 9012 along the direction of the incident sound wave is equal to a half wavelength in device 9012, and the thickness L3 of medium 9022 along the direction of the incident sound wave is equal to a half wavelength in medium 9022. The wavelengths in the above media are different, because the speed of sound depends on the acoustic character of the medium, namely, here the wavelength of device 9012 is longer than that of the medium 9022, and therefore L2 is longer than L3.

The backward multi-reflection of device 9301 can be avoided under the condition of equation (11):

$$S21 \times \frac{Zc - Z23}{Zc + Z23} = S22 \times \frac{Z24 - Z22}{Z24 + Z22}, \tag{11}$$

where,

S21: total area of the back face of the device 9012 except S22;

S22: total area of the holes at the back face of the device 9012, which is equal to the total area of the back face of the medium 9022;

Zc: acoustic impedance of the device 9012;

Z22: acoustic impedance of the medium 9022;

Z23: acoustic impedance of the damper 9032; and

Z24: acoustic impedance of the damper 9033.

The forward multi-reflection of the element 9301 can be avoided the same way as mentioned in connection with FIGS. 29(A) and (B). Therefore, this modified transducer element 9301 of FIG. 30 can avoid both front and back multi-reflections.

For avoiding the back multi-reflection as described above, if we assume that:

the front and back faces of a piezo-electric device (device) are divided into divided faces by inserting an acoustic medium (medium) into holes in the device, along sound propagation, to distribute the medium uniformly on both faces; and a face of an acoustic damper (damper) attached to the back face of the device and the medium described above are also divided into divided faces for the device and for the medium, then the equation (11) can be generalized to:

$$Sa \times Rc = Sb \times Rd = 0 \tag{12}$$

where,

Sa: total area of damper's divided faces contacted to the device;

Rc: substantial reflection factor of the damper contacted to device;

Sb: total area of the damper's divided faces contacted to the medium; and

Rd: substantial reflection factor of the damper attached to medium.

In the above generalization, it has been assumed that, the "device" and "medium" are made of single materials. But a case can be considered in which the device or medium is made from different kind of material. The scope of the invention extends to such a case. For such a case, the equation (12) can be applied, except that the reflection factor is to be taken as the substantial reflection factor for the respective combination of the "device" or "medium" parts.

FIGS. 31(A) and (B); illustrate another embodiment of a transducer element 9311. FIG. 31(A) shows a front view of the element 9311, and FIG. 31(B) shows a sectional view of it as viewed at the section indicated by the line 9310 in FIG. 31(A). In the figures, 9013 is a piezo-electric device, 9023 is an acoustic medium which is glued on the front face of element 9311 and is distributed uniformly like the holes in FIGS. 29(A) and (B), 9053 is an acoustic coating which coats the front face of the device 9013 and medium 9023, 9034 is an acoustic damper attached to the back face of the device 9013, and t is the thickness of the medium 9023 along the direction of the incident sound wave, which should be so thin that the thickness does not affect phase cancellation.

The forward multi-reflection of the element 9311 can be avoided by the proper acoustic impedance and area according to the above, each determined by the following equation (13):

$$S31 \times \frac{Zc - Z34}{Zc + Z34} = S32 \times \frac{Z34 - Z32}{Z34 + Z32}, \tag{13}$$

where,

S31: total area of the front face of the device 9012 except S32;

S32: total area of medium 9023 looking backward from the front face of the element 9311;

Zc: acoustic impedance of the device 9013;

Z32: acoustic impedance of the medium 9023; and

Z34: acoustic impedance of the coating 9053.

The embodiments mentioned above relate to avoiding acoustic multi-reflection at the front and back faces of a piezo-electric device. However, this method can be applied not only to the piezo-electric device but also to an acoustic coating or an acoustic damper independently.

Figure 32:
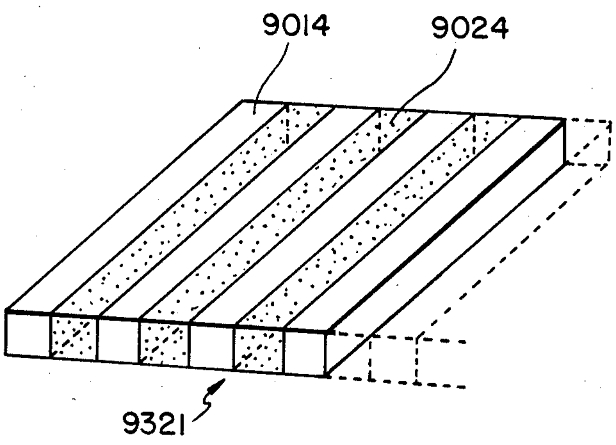
FIG. 32 shows schematically a perspective diagram of still another embodiment employing an array transducer structure having array gaps filled by an acoustic medium, wherein the impedance of the medium is different from the impedance of the array elements.

FIG. 32 illustrates another embodiment of a electro-sound transducer showing its structure. In this figure, 9321 is an array transducer consisting of a peizo-electric device 9014 and an acoustic medium 9024. Forward multi-reflection can be avoided by providing the impedance and area of the device 9014 and the medium 9024 so as to satisfy an equation similar to equation (10).

In an array transducer, generally, the piezo-electric devices are arranged alternately with a gap. Therefore, transducer 9321 can be fabricated simply by filling this gap with the acoustic medium 9024.

As has been described above, the invention has been disclosed with respect to several embodiments. Thus, instead of a linear or array scanning, the plurality of transducer elements can be operated to provide focusing in the target to be diagnosed, while making use of the other features of the present invention. Many applications or modifications of the above embodiments can occur to those skilled within the art, but they are all in the scope of the present invention.

We claim:

1. An electro-sound transducer for ultrasonic diagnosis of a target comprising:

a piezo-electric device which transduces electric pulse signals to ultrasonic sound waves which are provided to be incident on said target and which transduces reflected sound waves, corresponding to said ultrasonic sound waves, that are incident on a surface of said piezo-electric device to provide respective electric signals;

said piezo-electric device including a plurality of transducer elements having respective surfaces for emitting said sound waves incident on said target as a synthesized sound-beam along at least one main direction, each of said directions being different from the normals to said surfaces of at least a majority of said surfaces of said transducer elements;

wherein errors in the diagnosis are avoided by limiting the transducing of said reflected sound waves which have been reflected at least once from said surface of said piezo-electric device with respect to the others of said reflected sound waves; and wherein reflection of said respective reflected sound waves from at least the majority of said surfaces of said transducer elements of said piezo-electric device provides said limiting of said transducing.

2. The transducer of claim 1, comprising a probe unit having an outer wall surface, wherein said piezo-electric device is located on said outer wall surface of said probe unit.

3. The transducer of claim 1, wherein said piezo-electric device comprises a plurality of transducer elements having respective surfaces for providing said incident sound waves as a synthesized sound beam along at least one main direction, said transducer further comprising a probe unit which contains said piezo-electric device and includes:

an acoustically transparent window inlaid in an aperture of said probe unit through which said sound waves are radiated;

an acoustically transmissible medium filled between said transducer elements and said window; and an acoustic absorber on a surface of said probe unit for absorbing respective reflected sound waves reflected from said transducer elements to be incident thereon, so as to provide said limiting of said transducing.

4. The transducer of claim 3, said probe unit further comprising an acoustic reflector located in said probe unit in front of said piezo-electric device to scan said synthesized sound-beam across said target.

5. The tranducer of claim 2, 3 or 4, wherein said transducer elements are grouped in sub-unit elements each having less than ten of said transducer elements.

6. The transducer of claim 3 or 4, comprising:

said transducer elements being arranged on a predetermined one of a plane surface, a concave surface, and a convex surface;

said window being located in contact with said target;

said piezo-electric device being located so that said synthesized sound-beam intersects a surface of said window and target and the normal of at least a plurality of said surfaces of the transducer elements and said at least one main direction of the synthesized sound beam intersect substantially with an angle of skew.

7. The transducer of claim 1, wherein said transducer elements are arranged on a predetermined one of a plane surface, a concave surface and a convex surface.

8. The transducer of claim 7, comprising means for controlling said transducer elements by a phased array technique to generate said synthesized sound-beam and to perform at least one of focusing and scanning of said synthesized sound-beam in said at least one main direction.

9. The transducer of claim 7, comprising means for controlling said transducer elements by a linear array technique to generate and scan said synthesized sound-beam.

10. The transducer of claim 7, comprising means for controlling said transducer elements by a combination of phased array and linear array techniques.

11. The transducer of claim 8, 9, or 10, wherein said transducer elements are arranged on said plane surface, with the normal to the surface of each said transducer element being in the direction of the normal to said plane surface.

12. The transducer of claim 8, 9 or 10, wherein said transducer elements are arranged on said plane surface, with the normal to said plane surface being the same as said main direction of said synthesized sound-beam.

13. The transducer of claim 8, 9 or 10, wherein said transducer elements are arranged on said concave surface, said concave surface has a geometric axis along a direction that is different from said at least one main direction of said synthesized sound-beam, and the normal to the surface of each said transducer element is in the direction of the normal to the respective portion of said concave surface.

14. The transducer of claim 8, 9, or 10, wherein said transducer elements are arranged on said concave surface, said concave surface has a geometric axis, and the normal to the surface of each said transducer element is different from the normal to a respective portion of said concave surface, and said at least one main direction of said synthesized sound-beam is parallel with said geometric axis of said concave surface.

15. The transducer claim of 8, 9, or 10 wherein said transducer elements are arranged on said convex survace, said convex surface has a geometric axis along a direction different from said at least one main direction of said synthesized sound-beam, and the noraml to the surface of each said transducer element is in the direction of the normal to the respective portion of said convex surface where each said transducer element is arranged.

16. The transducer of claim 8, 9, or 10, wherein said transducer elements are arranged on said convex surface, said convex surface having a geometric axis, a direction of the normal to a surface of each said transducer element is different from the direction of the normal to a respective portion of said convex surface on which each said element is arranged, and said at least one main direction of said synthesized sound-beam is parallel with the geometric axis of said convex surface.

17. The transducer of claim 1, wherein said piezo-electric device includes an array of transducer elements spaced with gaps between adjacent elements, and each said gap is filled with an acoustic medium.

18. An electro-sound transducer for ultrasonic diagnosis of a target, comprising:

a piezo-electric device which transduces electric pulse signals to ultrasonic sound waves which are provided to be incident on said target and which transduces reflected sound waves, corresponding to said ultrasonic sound waves, that are incident on a surface of said piezo-electric device to provide respective electric signals;

wherein errors in the diagnosis are avoided by limiting the transducing of said reflected sound waves which have been reflected at least once from said surface of said piezo-electric device with respect to the others of said reflected sound waves;

said piezo-electric device having front and back faces;

at least one acoustic matching layer attached to at least one of said front and back faces of said piezo-electric device so as to provide said limiting of said transducing;

a front surface in contact with said target; and said piezo-electric device having an acoustic damper adjacent to said back face thereof, wherein the acoustic impedence looking from the direction of said front surface toward said acoustic damper is substantially equal to the acoustic impedance of said target contacted to said front surface.

19. The transducer of claim 18, comprising said acoustic matching layer being a quarter wavelength of said sound waves.

20. The transducer of claim 19, wherein said acoustic matching layer is located on said front face of said piezo-electric device.

21. An electrosound transducer for ultrasonic diagnosis of a target, comprising:

a piezo-electric device having front and back faces;

at least one acoustic matching surface formed on at least one of said front and back faces of said piezo-electric device an acoustic damper attached on said back face of said piezo-electric device; and said acoustic matching surface being formed on the back face of said piezo-electric device part and being formed of a respective piezo-electric device part and a respective part of an acoustic medium;

said acoustic damper having respective damper parts corresponding to said piezo-electric device part and said acoustic medium part;

the following relation obtaining between the total areas and the substantial acoustic reflection factors of said parts:

$$Sa \times Rc + Sb \times Rd = 0,$$

where,

Sa: total area of said piezo-electric device part;

Rc: substantial reflection factor of the damper part corresponding to said piezo-electric device part;

Sb: total area of said divided face of said acoustic medium part;

Rd: substantial reflection factor of the damper part corresponding to said acoustic medium part.

22. An ultrasonic diagnostic apparatus comprising said transducer of claim 2, 3, 4, 16, 18, or 21.

23. The transducer of claim 21, wherein said piezo-electric device part has a plurality of holes in which said acoustic medium is filled for providing said acoustic medium part, said holes being provided in said piezo-electric device part aligned along a main direction of propagation of said incident sound waves.

24. An electro-sound transducer for ultrasonic diagnosis of a target, comprising:

a piezo-electric device having front and back faces at least one acoustic matching surface formed on at least one of said front or back faces of said piezo-electric device;

an acoustic damper attached on said back face of said piezo-electric device;

said acousting matching surface being on said front face of said piezo-electric device and being formed of a respective part of said piezo-electric device combined uniformly with a respective part of an acoustic medium, wherein the following relation between total area and substantial acoustic reflection factor of said respective parts obtains:

$$Sa \times Ra + Sb \times Rb = 0$$

where

Sa: total area of said piezo-electric device part;

Ra: substantial reflection factor of said piezo electric device part;

Sb: total area of said acoustic medium part; and

Rb: substantial reflection factor of said acoustic medium part.

25. The transducer of claim 24, wherein said piezo-electric device is formed by applying said acoustic medium on said front face of said piezo-electric device.

26. The transducer of claim 21 or 24, wherein said piezo-electric device transducers electric pulse signals to ultrasonic sound waves which are provided to be incident on said target and which transduces reflected sound waves, corresponding to said ultrasonic sound waves, that are incident on a surface of said piezo-electric device to provide respective electric signals;

wherein errors in the diagnosis are avoided by limiting the transducing of said reflected sound waves which have been reflected at least once from said surface of said piezo-electric device with respect to the others of said reflected sound waves, and wherein said limiting is provided by each respective one of said acoustic matching surfaces.

* * * * *

UNITED STATES PATENT AND TRADEMARK OFFICE

CERTIFICATE OF CORRECTION

PATENT NO. : 4,552,021

DATED : 12 Nov. 1985

INVENTOR(S) : Hirohide Miwa et al

It is certified that error appears in the above-identified patent and that said Letters Patent is hereby corrected as shown below:

Col. 2, line 47, "as the sometime" should be --at the same time--.

Col. 7, line 27, "Usec" should be --microsec--;
line 29, after "to" insert --radiate--.

Col. 9, line 46, "any" should be --away--;
line 68, change "an cost of" to --the cost of the--.

Col. 10, line 3, before "details" insert --further--.

Col. 12, line 1, after "The" insert --above--;
line 13, after "The" insert --acoustic--.

Col. 13, line 11, delete "reflected" (first occurrence).

Col. 16, line 8, "R13 > 0 if Z10 > Z30" should be --R13 < 0 if Z10 < Z30--.

Claim 5, line 1, "Tranducer" should be --transducer--.

Signed and Sealed this

*Eighteenth* Day of *March 1986*

[SEAL]

*Attest:*

DONALD J. QUIGG

*Attesting Officer* *Commissioner of Patents and Trademarks*